(12) United States Patent
Cao et al.

(10) Patent No.: US 10,374,789 B2
(45) Date of Patent: Aug. 6, 2019

(54) ENCRYPTING AND DECRYPTING INFORMATION

(71) Applicant: Alibaba Group Holding Limited, Grand Cayman (KY)

(72) Inventors: Kai Cao, Hangzhou (CN); Jie Zhang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 15/784,012

(22) Filed: Oct. 13, 2017

(65) Prior Publication Data

US 2018/0054299 A1 Feb. 22, 2018

Related U.S. Application Data

(63) Continuation of application No. 14/845,144, filed on Sep. 3, 2015, now Pat. No. 9,825,757.

(30) Foreign Application Priority Data

Sep. 5, 2014 (CN) .......................... 2014 1 0450075

(51) Int. Cl.
*H04L 29/06* (2006.01)
*H04L 9/00* (2006.01)
(Continued)

(52) U.S. Cl.
CPC ............... *H04L 9/00* (2013.01); *H04L 9/008* (2013.01); *H04L 9/0866* (2013.01); *H04L 9/3093* (2013.01)

(58) Field of Classification Search
CPC .................................. H04L 9/00; H04L 9/008
(Continued)

(56) References Cited

U.S. PATENT DOCUMENTS 8,312,291 B2 11/2012 Golic et al.
2009/0310779 A1 12/2009 Lam et al.
(Continued)

FOREIGN PATENT DOCUMENTS

CN 101093626 A 12/2007
JP H07327029 A 12/1995
(Continued)

OTHER PUBLICATIONS

Office action for U.S. Appl. No. 14/845,144, dated Feb. 7, 2017, Cao et al., "Encrypting and Decrypting Information", 9 pages.
(Continued)

*Primary Examiner* — Anthony D Brown
(74) *Attorney, Agent, or Firm* — Lee & Hayes, P.C.

(57) ABSTRACT

An example information encryption method that includes acquiring to-be-encrypted information and converting the to-be-encrypted information into a polynomial of a predetermined format; extracting biometric information, and acquiring biometric data; and substituting the biometric data into the polynomial for calculation to acquire a value of the polynomial and using a two-dimensional dataset including the biometric data and the value of the polynomial corresponding to the biometric data as first encrypted information. The techniques of the present disclosure improve the security of information encryption, and reduce the risk of illegal decryption of encrypted information.

20 Claims, 15 Drawing Sheets

(51) Int. Cl.
*H04L 9/08* (2006.01)
*H04L 9/30* (2006.01)

(58) Field of Classification Search
USPC .......................................................... 713/186
See application file for complete search history.

(56) References Cited

U.S. PATENT DOCUMENTS

| | | | |
|---|---|---|---|
| 2010/0017618 | A1 | 1/2010 | Golic |
| 2010/0083000 | A1 | 4/2010 | Kesanupalli |
| 2010/0223499 | A1* | 9/2010 | Panigrahy ........... G06F 11/0709 714/19 |
| 2010/0316260 | A1 | 12/2010 | Nenni, Jr. |
| 2011/0126024 | A1 | 5/2011 | Beatson et al. |
| 2012/0300923 | A1 | 11/2012 | Arakawa et al. |
| 2013/0297945 | A1 | 11/2013 | Harris |
| 2013/0305055 | A1 | 11/2013 | Atherton |
| 2014/0185794 | A1 | 7/2014 | Yasuda et al. |
| 2014/0281567 | A1* | 9/2014 | Rane ........................ G06F 21/32 713/186 |
| 2016/0072801 | A1 | 3/2016 | Cao et al. |

FOREIGN PATENT DOCUMENTS

| | | |
|---|---|---|
| JP | 2000358025 A | 12/2000 |
| JP | 2006072709 A | 3/2006 |
| JP | 2006270697 A | 10/2006 |
| JP | 2009507267 A | 2/2009 |
| JP | 2011035739 A | 2/2011 |

OTHER PUBLICATIONS

PCT Search Report and Written Opinion dated Jan. 13, 2016 for PCT application No. PCT/US15/48416, 7 pages.

Translated Chinese Office Action for Chinese Patent Application No. 201410450075.X, dated Feb. 2, 2018, a counterpart foreign application of U.S. Appl. No. 15/784,012, 10 pages.

Translated Chinese Search Report for Chinese Patent Application No. 201410450075.X, dated Jan. 4, 2018, a counterpart foreign application of U.S. Appl. No. 15/784,012, 2 pages.

Deng, et al., "Fingerprint minutiae feature encryption based on fuzzy vault scheme", Computer Engineering and Design, vol. 31, No. 4, Feb. 28, 2010, pp. 720-723.

Li, et al., "Ear template encryption based on fuzzy vault", Journal of Central South University (Science and Technology), vol. 42, Suppl. 1, Sep. 2011, pp. 778-783.

Extended European Search Report dated Feb. 13, 2018 for European Patent Application No. 15838704.3, 6 pages.

Vetro, et al., "Securing Biometric Data", Mitsubishi Electric Research Laboratories, Apr. 2009, pp. 1-16.

The Japanese Office Action dated Mar. 26, 2019 for Japanese Patent Application No. 2017-508609, a couterpart of U.S. Pat. No. 9,825,757, 14 pages.

Nandakumar et al, "Fingerprint-Based Fuzzy Vault: Implementation and Performance," retrieved on Mar. 14, 2019 at <<https://ieeexpllore.ieee.org/stamp/stamp.jsp?tp=&arnumber=4378259>>, IEEE Transactions on Information Forensics and Security, vol. 2, No. 4, Dec. 2007, 14 pages.

* cited by examiner

ENCRYPTING AND DECRYPTING INFORMATION

CROSS-REFERENCE TO RELATED PATENT APPLICATION

This application claims priority to and is a continuation of U.S. patent application Ser. No. 14/845,144 filed Sep. 3, 2015, entitled "ENCRYPTING AND DECRYPTING INFORMATION," which claims foreign priority to Chinese Patent Application No. 201410450075.X filed on Sep. 5, 2014, entitled "Method and Apparatus for Encrypting and Decrypting Information," which applications are hereby incorporated by reference in their entirety.

TECHNICAL FIELD

The present disclosure relates to the field of information communications, and, more particularly, to a method and apparatus for encrypting and decrypting information in information communication.

BACKGROUND

Along with the maturing of two-dimensional code information technologies, two-dimensional codes are gradually recognized and accepted by people. The two-dimensional code generally has advantages such as a large information capacity, a broad coding range, a strong fault-tolerant capability, a low manufacturing cost, and an automatic recognition, which is widely applied in various industries such as instant messaging, e-commerce, information promotion, and product anti-forgery.

Generally, the two-dimensional code may include a two-dimensional bar code and a two-dimensional matrix code, which may be symbol information that is distributed on a plane (a two-dimensional direction) by a particular geometry according to a certain rule and records data with a black and white graph. The two-dimensional code generally uses the concept of "0", "1" bit streams that form an internal logic base of a computer in terms of code instrumentation, and expresses original information as two-dimensional data by using binary codes corresponding to the original information. The two-dimensional data may be converted into a corresponding two-dimensional code image by two-dimensional code generation software. For example, in a two-dimensional matrix code, a graph formed by a different distribution of black and white pixels in a rectangular two-dimensional plane may be used to express the two-dimensional data. The "1" in the binary data of the two-dimensional code may indicate that a pixel element shows up at a location in the rectangular two-dimensional plane, and may be indicated by a black square; the "0" in the binary data of the two-dimensional code may indicate that a pixel element does not show up at a location in the rectangular two-dimensional plane, and may be indicated by a white square. The two-dimensional code data may be expressed as a two-dimensional code graph formed by arranging and combining black and white squares of the rectangular two-dimensional plane.

In the process of using the two-dimensional code, in order to improve the security of the two-dimensional code data, the two-dimensional code data may be encrypted, and then a two-dimensional code graph may be generated with the encrypted two-dimensional code data. The commonly used two-dimensional code data encryption method may include encrypting two-dimensional code data by using a key, and generating a two-dimensional code graph with the key-encrypted two-dimensional code data. The two-dimensional code image may also include encrypted key information. Correspondingly, the receiver may decrypt the two-dimensional code data by using the key to acquire information before encryption. However, the key for encrypting two-dimensional code data is generally data information generated by a computing device according to a certain algorithm, and there are risks of being easily stolen, intercepted, broken, and the like by illegal users during the key storage or transmission. Once the key is acquired by the illegal users, the illegal users may crack or falsify the two-dimensional code data by using the stolen key, or give a fake or even malicious two-dimensional code data by using the key, which may cause a huge damage to the users. In the conventional techniques, there is still a risk of being acquired by the illegal users in terms of the key information for encrypting the two-dimensional code data, which reduces the security of the encrypted two-dimensional code data.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides an information encryption and decryption method and apparatus, which reduce the risk of being acquired by illegal users in terms of the key for encrypting two-dimensional code data, and improve the security of encrypted two-dimensional code data.

The present disclosure provides an example information encryption method, which may include the following operations:

extracting biometric information and acquiring biometric data; and encrypting to-be-encrypted information with the biometric data according to a preset encryption algorithm to form first encrypted information.

In an example implementation of the information encryption method, the encrypting to-be-encrypted information with the biometric data according to a preset encryption algorithm to form the first encrypted information may include the following operations:

converting the to-be-encrypted information into a polynomial of a predetermined format; and substituting the biometric data into the polynomial for calculation to acquire a value of the polynomial, and using a two-dimensional dataset including the biometric data and the value of the polynomial corresponding to the biometric data as the first encrypted information.

In an example implementation of the information encryption method, the method may further include adding check code information in the to-be-encrypted information.

Correspondingly, the converting the to-be-encrypted information into a polynomial of a predetermined format may include converting the to-be-encrypted information with the added check code into the polynomial of the predetermined format or adding hash data in the first encrypted information.

The present disclosure also provides another example information decryption method, which may include the following operations:

extracting biometric information, and acquiring to-be-verified biometric data;

acquiring encrypted sample data stored in a sample database, matching the sample data with the to-be-verified biometric data according to a predetermined matching rule, and using sample data meeting a matching requirement as candidate sample data;

selecting N groups of data from the candidate sample data, and calculating coefficients in a Lagrange interpolation polynomial corresponding to the selected N groups of data by using a Lagrange interpolation method, N being a preset number of groups of selected data; and combining the acquired coefficients of the Lagrange interpolation polynomial into the first decrypted information according to a predetermined sequence of combination.

The present disclosure also provides an example information encryption apparatus, which may include:

an information receiving module that acquires to-be-encrypted information;

a biometric information module that extracts biometric information and acquires biometric data; and an encryption module that encrypts the to-be-encrypted information with the biometric data according to a preset encryption algorithm to form the first encrypted information.

In an example implementation of the information encryption apparatus, the encryption module may include:

an information conversion module that converts the to-be-encrypted information into a polynomial of a predetermined format; and a mapping module that substitutes the biometric data into the polynomial for calculation to acquire a value of the polynomial, and forms the first encrypted information based on two-dimensional data including the biometric data and the value of the polynomial corresponding to the biometric data.

The preset disclosure provides an example information decryption apparatus, which may include:

a biometric extraction module that extracts biometric information and acquires to-be-verified biometric data;

a predetermined matching rule module that stores a preset matching rule of sample data and to-be-verified biometric data and a matching requirement of candidate sample data;

a characteristic matching module that acquires sample data stored in a sample database, and selects candidate sample data according to the predetermined matching rule and the matching requirement;

a data selection module that selects N groups of data from the selected candidate sample data, N being a preset number of groups of selected data;

a coefficient calculation module that calculates coefficients in a Lagrange interpolation polynomial corresponding to the selected N groups of data by using a Lagrange interpolation method; and a first decryption module that combines the acquired coefficients of the Lagrange interpolation polynomial into the first decrypted information according to a predetermined sequence of combination.

The information encryption and decryption method and apparatus provided in the present disclosure convert to-be-encrypted information into an expression form of a polynomial of a predetermined format, and at the same time extract biometric information such as a fingerprint and a retina, and convert the biometric information into biometric data. Then, the biometric data is projected to the expression of the to-be-encrypted information to form a data point set including the biometric data and a value of the expression corresponding to the biometric data, and complete the encryption of the to-be-encrypted information. Correspondingly, during the decryption, the encrypted information may be decrypted in combination with the biometric data for the encryption. The information encryption and decryption method provided in the present disclosure combines the key information with biometric information, and achieves higher security of the encrypted information by using the stability and uniqueness of the biometric information. Meanwhile, during the decryption, original data is acquired by biometric information matched with the biometric information in the encrypted information, which reduces the risk of the illegal cracking and acquisition of the encrypted information.

BRIEF DESCRIPTION OF THE DRAWINGS

To clearly describe the technical solutions For examples of the present disclosure, the following briefly introduces the accompanying drawings for describing the example embodiments of the present disclosure. Apparently, the accompanying drawings described in the following are merely some embodiments described in the present disclosure, and a person of ordinary skill in the art may still derive other drawings from these accompanying drawings without creative efforts.

DETAILED DESCRIPTION

In order for a person skilled in the art to better understand the technical solutions in the present disclosure, the technical solutions in the example embodiments of the present disclosure are clearly and fully described in the following disclosure with reference to the accompanying drawings in the example embodiments of the present disclosure. Apparently, the example embodiments to be described merely represent a part and not all of the embodiments of the present disclosure. All other embodiments acquired by persons of ordinary skill in the art based on the embodiments of the present disclosure without creative efforts shall belong to the protection scope of the present disclosure.

Figure 1:
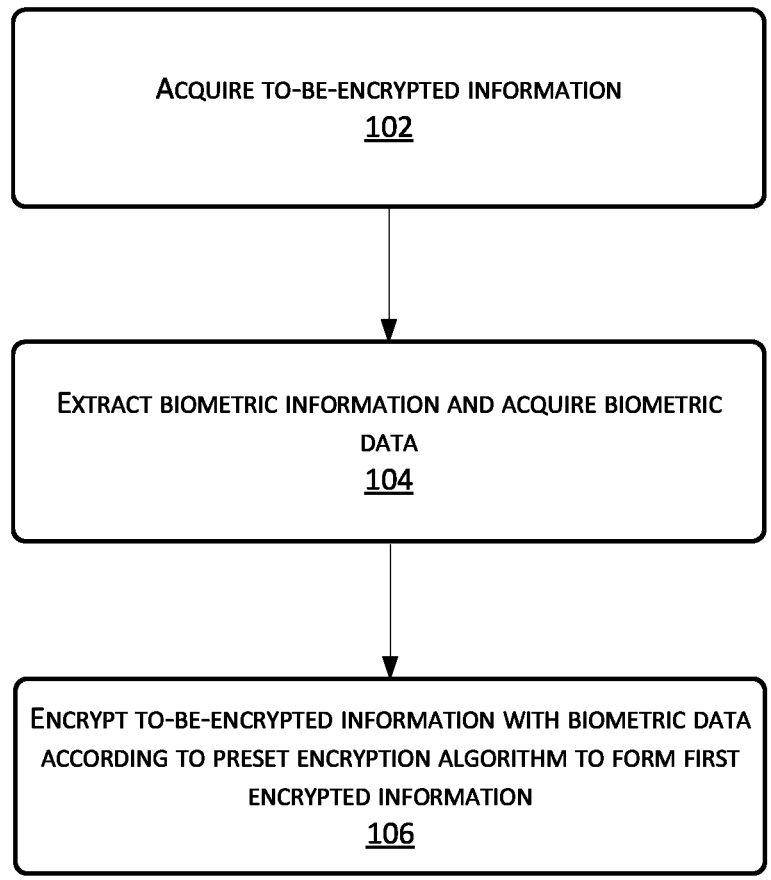
FIG. 1 is a method flow chart of an example embodiment of an information encryption method according to the present disclosure.

The present disclosure provides an example information encryption method, and FIG. 1 is a method flow chart of an example embodiment of the information encryption method according to the present disclosure. As shown in FIG. 1, the example information encryption method may include the following operations.

At 102, to-be-encrypted information is acquired.

The to-be-encrypted information in the example embodiment may include a key for encrypting original data, for example, a key for encrypting two-dimensional code data. The key may either be encrypted data generated by an application for generating a key according to a certain rule or a random rule, or an identifier preset for indicating an encryption algorithm for encrypting the original data or indicating a certain encryption algorithm. It should be noted that the to-be-encrypted information in the present disclosure is not limited to the key for encrypting the original data, but may also be other information that needs to be encrypted. For example, the to-be-encrypted information in the example embodiment may also include user information for a registration, such as a user name, an identity number, a telephone number, or a picture or voice of the users.

The to-be-encrypted information may generally be information data formed according to a predetermined coding, and may include data information in numbers, letters, or any other forms. The present disclosure may convert the to-be-encrypted information into information data formed by a unified predetermined coding. For example, in the example embodiment, the predetermined coding may be 32-bit binary data, such as, 32-bit binary key data 01110101011100110110010101110010 for encrypting two-dimensional code data. Certainly, the present disclosure may also convert the original information that needs to be encrypted, such as voice, an image, and a text, into to-be-encrypted information formed by a predetermined coding. For example, the techniques of the present disclosure may convert a user name "user" into the to-be-encrypted information in a corresponding binary data format. In case of the to-be-encrypted information being information such as an image or voice, it may be converted into to-be-encrypted information formed by a predetermined coding through a corresponding conversion method or device. In the present disclosure, the predetermined coding may also be other data coding modes, for example, decimal data or hexadecimal data formed according to a predetermined information coding format.

To-be-encrypted information is acquired, and the to-be-encrypted information may include a key for encrypting two-dimensional code data.

At 104, biometric information is extracted, and biometric data is acquired.

The biometric information may include biometric information data that is extracted from a biological subject and may be used to identify the biological subject. Generally, the biometric information may include inherent biological feature or behavior feature of a human being or other organisms, wherein the biological feature is generally congenital, such as a fingerprint, a retina, an iris, and a palm print of the human; the behavior feature is generally an acquired habit feature having differentiability, such as signature handwriting, a gait, etc. Generally, biometric information of a certain portion of a biological subject may be extracted by using a video camera, a fingerprint reader, and so on, and then the extracted biometric information is converted into biometric data. In terms of the biometric data, in general, a computer may be connected to an acoustic device, an optical device or other biological sensors to acquire biometric information, and the biometric information is converted into data in the form of digital code. The commonly used biometric feature extraction method may include Daubichies Wavelet Transform, Fisher eigenfaces, Gabor filtering-based fingerprint enhancement, intellisense algorithm, and so on. Upon the extraction of the biometric information, the biometric information may be formed into biometric data by a preset coding rule. Different biometric extraction methods may correspond to different biometric data, which, in general, may be converted into a unified data format in the data processing.

The specific biometric extraction method is not limited to the present disclosure, and the present disclosure may convert biometric data acquired by different biometric extraction methods into a unified data information format. For example, the techniques of the present disclosure may express biometric data acquired by different biometric extraction methods in a unified manner by a one-dimensional dataset $\{a_1, a_2, a_3 \ldots, a_n\}$, wherein n may indicate the number of data in the one-dimensional dataset. In a specific example, the biometric data that may be acquired by the intellisense algorithm is a 128-bit one-dimensional dataset $a_n=\{8, 10, 12, 13, 15 \ldots 296\}$. The data in the one-dimensional dataset may be arranged according to a certain sequence, for example, arranged from small to large according to the biometric data, or arranged according to extraction positions or an extraction sequence of the biometric information, or the like. In the example embodiment, the biometric data of the acquired one-dimensional dataset may be arranged from small to large according to the value. The extracted biometric data may be stored in a server or a client or a dedicated database.

In the example embodiment, biometric information such as a fingerprint, a retina, an iris and a voice may be extracted to obtain the biometric data.

At 106, the to-be-encrypted information is encrypted with the biometric data according to a preset encryption algorithm to form the first encrypted information.

After the to-be-encrypted information and the biometric data are acquired, the to-be-encrypted information may be encrypted with the biometric data according to a preset encryption algorithm to form the first encrypted information. For example, the encrypting to-be-encrypted information with the biometric data according to a preset encryption algorithm to form the first encrypted information may include the following operations:

The to-be-encrypted information is converted into a polynomial of a predetermined format.

The biometric data is substituted into the polynomial for calculation to acquire a value of the polynomial, and a two-dimensional dataset including the biometric data and the value of the polynomial corresponding to the biometric data is used as the first encrypted information.

In the example embodiment, the to-be-encrypted information may be converted into a polynomial of coefficients and variables of a predetermined format. For example, the binary data of the embodiment may be converted into a polynomial form, which is a sum of multiple monomials each being a product of a coefficient and a weight, and a weight of the converted polynomial is used as the variable of the polynomial. For example, a polynomial of coefficients and weights converted from to-be-encrypted information 1011 may be: $1*2^{\wedge}3+0*2^{\wedge}2+1*2^{\wedge}1+1*2^{\wedge}0$, wherein the weight 2 in the polynomial may be used as a variable x of the polynomial, and therefore, a polynomial: $p(x)=1*x^{\wedge}3+0*x^{\wedge}2+1*x^{\wedge}1+1*x^{\wedge}0$ may be formed. The same to-be-encrypted information may be converted into multiple different polynomials through different conversions. For example, the to-be-encrypted information 1011 may be converted into decimal data 11, which may be expressed by a polynomial $1*10^{\wedge}1+1*10^{\wedge}0$. The weight 10 in the polynomial $1*10^{\wedge}1+1*10^{\wedge}0$ may be expressed by an independent variable x, and in this case, another polynomial of the to-be-encrypted information 1011 may be expressed as: $p(x)=1*10^{\wedge}1+1*10^{\wedge}0$. In the present disclosure, a format of the polynomial may be preset according to the requirement of data processing. For example, the to-be-encrypted information for which the predetermined coding is binary may be converted into hexadecimal data firstly, and then the to-be-encrypted information in the form of hexadecimal data is converted into an expression of a polynomial, and finally the weight 16 in the polynomial is used as a variable in the polynomial to construct a polynomial in the predetermined format. The polynomial in the present disclosure may either be a polynomial including multiple monomials, or a polynomial including one monomial.

The techniques of the present disclosure, when the to-be-encrypted information is converted into an expression of the polynomial, may convert the to-be-encrypted information into a polynomial of coefficients and weights directly. For example, the to-be-encrypted information is 32-bit binary data or decimal data, and the polynomial of the to-be-encrypted information may be directly expressed as a polynomial including 32 monomials. In another example implementation, the to-be-encrypted information may be segmented, and each segment of the to-be-encrypted information after the segmentation is processed, and finally each segment of the to-be-encrypted information after the processing is used as coefficients of a monomial corresponding to the segment, which For example may include the following operations:

At a first operation, the to-be-encrypted information is segmented into k segments expressed by monomials $a_1*x^{\wedge}(k-1)$, $a_2*x^{\wedge}(k-2) \ldots a_k*x^{\wedge}0$ from high-bit to low-bit respectively.

For example, when the to-be-encrypted information is 32-bit binary key data 01110101011100110110010101110010, the to-be-encrypted information may be segmented uniformly into 4 segments from high-bit to low-bit, and each segment is 8-bit (that is, one byte) binary data. Certainly, the number of binary data included in each segment of the to-be-encrypted information after the segmentation may also be different. For example, the 4 segments of data formed by segmenting the 32-bit binary key data may be 8-bit, 10-bit, 6-bit, and 8-bit binary data respectively. For example, the segmentation processing may be set according to the requirement of data processing. The binary data from high-bit to low-bit acquired after the segmentation of the 32-bit to-be-encrypted information is 01110101, 01110011, 01100101, 01110010 respectively, and corresponding monomials thereof are $a_1*x^{\wedge}3$, $a_2*x^{\wedge}2$, $a_3*x^{\wedge}1$, $a_4*x^{\wedge}0$, wherein $a_1$, $a_2$, $a_3$ and $a_4$ are respective coefficients of monomials of the segments after the segmentation.

At a second operation, each segment of the to-be-encrypted information after the segmentation is converted into a first preset data format, and the to-be-encrypted information in the first preset data format after the conversion is used as coefficients of a monomial corresponding to the segment.

In the example embodiment, each segment of the to-be-encrypted information after the segmentation may be converted into a preset first preset data format. For example, each segment of 8-bit binary to-be-encrypted information may be converted into hexadecimal to-be-encrypted information. The first preset data format may include a decimal data format, a hexadecimal data format, or other data formats. After each segment of the to-be-encrypted information is converted into the first preset data format, each segment of the converted to-be-encrypted information may be used as coefficients of a monomial corresponding to the segment. For example, the to-be-encrypted information that is the 32-bit binary key data is segmented into 4 segments (01110101)B, (01110011)B, (01100101)B, (01110010)B respectively, each of which is one byte, and each segment of the to-be-encrypted information is converted into corresponding hexadecimal data format (75)Ox, (73)Ox, (65)Ox, (72)Ox. The hexadecimal data 75, 73, 65 and 72 is used as coefficients of a monomial of a corresponding segment respectively.

At a third operation, a polynomial of the to-be-encrypted information is constructed based on monomials of the k segments using the to-be-encrypted information of the first preset data format as coefficients.

After the to-be-encrypted information is segmented into k segments and a coefficient of a monomial corresponding to each segment of the to-be-encrypted information is calculated, a polynomial $p(x)=a_1*x^{\wedge}(k-1)+a_2*x^{\wedge}(k-2)+ \ldots +a_k*x^{\wedge}0$ may be constructed, and the to-be-encrypted information is converted into an expression in the form of the polynomial. In the constructed polynomial, x is a variable of the polynomial, $a_1, a_2, \ldots, a_k$ are coefficients of the polynomial, and (k-1), (k-2), k are powers of the variable x. In the example embodiment, the 32-bit binary to-be-encrypted information may be segmented into 4 segments, and when the first preset data format is hexadecimal, the following polynomial p(x) may be constructed:

$$p(x)=75*x^{\wedge}3+73*x^{\wedge}2+65*x^{\wedge}1+72*x^{\wedge}0 \quad (1)$$

It should be noted that, in case of the construction of the polynomial of the to-be-encrypted information, if the data value of a segment of the to-be-encrypted information after the conversion into the first preset data format is 0, the expression of the constructed polynomial may still retains the monomial of the segment, which may be expressed by using a product of the monomial corresponding to the segment of the to-be-encrypted information and a coefficient 0. For example, in the 4 segments of data after the segmentation, a first preset data value of the second segment of the to-be-encrypted information corresponding to $x^{\wedge}2$ is 0, and in the constructed polynomial, the monomial of the segment may be expressed by using $0*x^2$, wherein the coefficient of $0*x^2$ is 0.

In the present disclosure, when the first preset data format is in other data coding formats, or when the number n of segments of the to-be-encrypted information after the segmentation and the number of bits included in each segment of the to-be-encrypted information are different, the coefficient after the conversion of the to-be-encrypted information may be different, and the constructed polynomial may also be different. For example, the number of segments, data included in each segment, and data processing method in each segment may be preset according to the data processing requirement to convert the to-be-encrypted information into a polynomial of a predetermined format.

In the example embodiment, the biometric data may be substituted into the polynomial constructed by the to-be-encrypted information to acquire a value of the polynomial having the biometric data substituted. For example, the biometric data $\{a_1, a_2, a_3 \ldots, a_n\}$ is substituted into the constructed polynomial p(x) to acquire a value $p(a_n)$ of the polynomial through calculation. The substituted biometric data and the value of the corresponding polynomial may form a set of two-dimensional data, for example, $(a_1, p(a_1))$. Then, the acquired biometric data and the value of the polynomial may be formed into a two-dimensional data set $\{(a_1, p(a_1)), (a_2, p(a_2)), (a_3, p(a_3)), \ldots, (a_n, p(a_n))\}$, and the two-dimensional dataset is used as the first encrypted information acquired by encrypting the to-be-encrypted information with the biometric data. For example, a 128-bit one-dimensional dataset $a_n = \{8, 10, 12, 13, 15, \ldots, 296\}$ may be substituted into the formula (1) to acquire a two-dimensional dataset $\{(8, 43664), (10, 83026), (12, 140964), \ldots, (296, 1951490480)\}$. The formed two-dimensional dataset may be used as encrypted first encrypted information formed by combining the to-be-encrypted information and the biometric information. It should be noted that, the operation in the above encryption process is a calculation in a finite field, and the encrypted first encrypted information may be stored in a server, a client terminal, or a dedicated database as a sample data template corresponding to the biometric information.

The above example embodiment provides a method of encrypting the to-be-encrypted information in combination with biometric information. In the method, a biometric feature extraction method may be used to extract a biometric vector in the biometric information to acquire biometric data, and then the biometric data is projected to a high-order polynomial constructed by the to-be-encrypted information. After the projection operation, the two-dimensional dataset including the biometric data and a value of the corresponding projected polynomial will be used as the information that is acquired after the to-be-encrypted information is encrypted with the biometrics. The information encryption method of the present disclosure combines biometric information of an individual in the process of encryption, which greatly improves the security of information encryption. At the same time, the encryption process of the present disclosure, in which the original to-be-encrypted information is converted to construct a high-order polynomial and then the biometric data is projected onto the high-order polynomial, produces great differences between the original to-be-encrypted information and the encrypted information in terms of information data format, information data dimension, and the like, which increases the difficulty in illegal reverse cracking of the encrypted information, and further improves the security of the information encryption.

Figure 2:
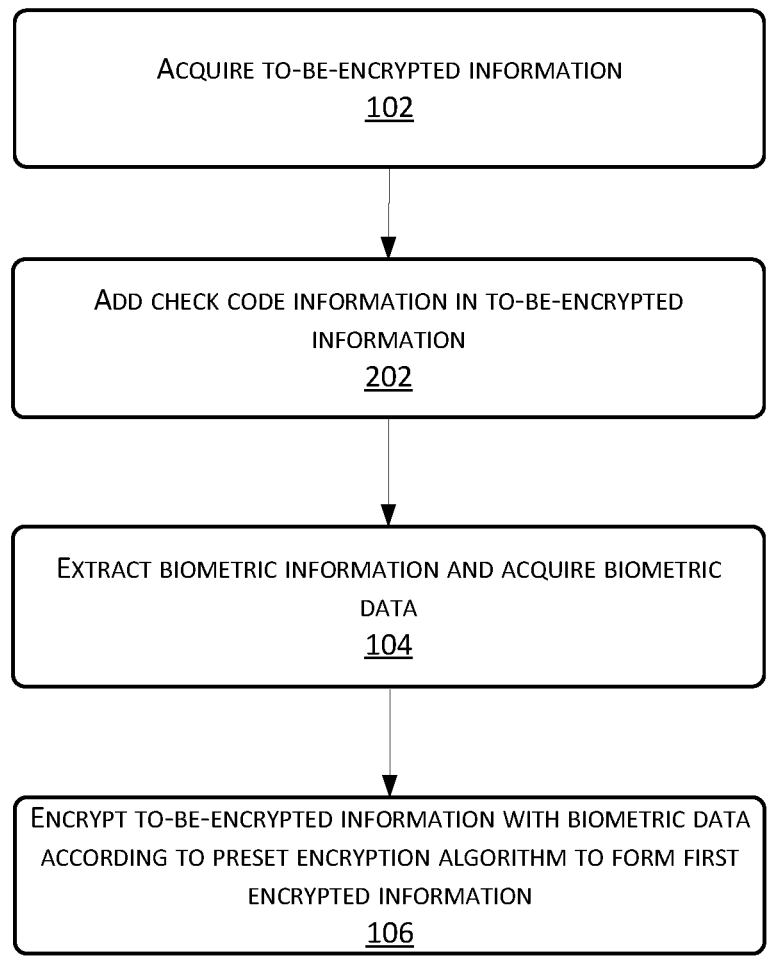
FIG. 2 is a method flow chart of another example embodiment of an information encryption method according to the present disclosure.

In another example implementation of the information encryption method of the present disclosure, FIG. 2 is a flow chart of another implementation of the example information encryption method according to the present disclosure. As shown in FIG. 2, in addition to the operations as shown in FIG. 1, the method may further include the following operation:

At 202, check code information is added in the to-be-encrypted information.

Correspondingly, the converting the to-be-encrypted information into a polynomial of a predetermined format may include converting the to-be-encrypted information with the added check code into the polynomial of the predetermined format.

The check code may include one or more bits of data acquired through calculation of original data by using a certain rule and used to verify correctness of the original data. For example, a Cyclic Redundancy Check (CRC) may be added at the end of the to-be-encrypted information as the check code, and may be used to verify correctness of information after decryption during subsequent information decryption. When the length of the to-be-encrypted information is k bits, and the length of the added check code is r bits, the check code may be acquired by the following operations: shifting the to-be-encrypted information leftward by r bits to form a first information code; and module-2 dividing the first information code by selected check data and using an acquired remainder as the check code of the to-be-encrypted information.

For instance, the to-be-encrypted information is 7-bit binary data 1011101, the selected check data is 10101, the length of the check code is 4-bit binary data, and therefore, the to-be-encrypted information may be shifted leftward by 4 bits to form the first information code 10111010000. Then, the first information code 10111010000 is module-2 divided by the selected check data 10101 to acquire a reminder 0111. That is, the check code of the to-be-encrypted information 1011101 is 0111. The check code 0111 may be added to the end of the to-be-encrypted information 1011101 to form the first to-be-encrypted information 10111010111. In the example embodiment, the specific number of bits of the added check code may be set according to the requirement of data processing. For example, an 8-bit CRC may be added to the end of the to-be-encrypted information that is 32-bit key data.

Figure 3:
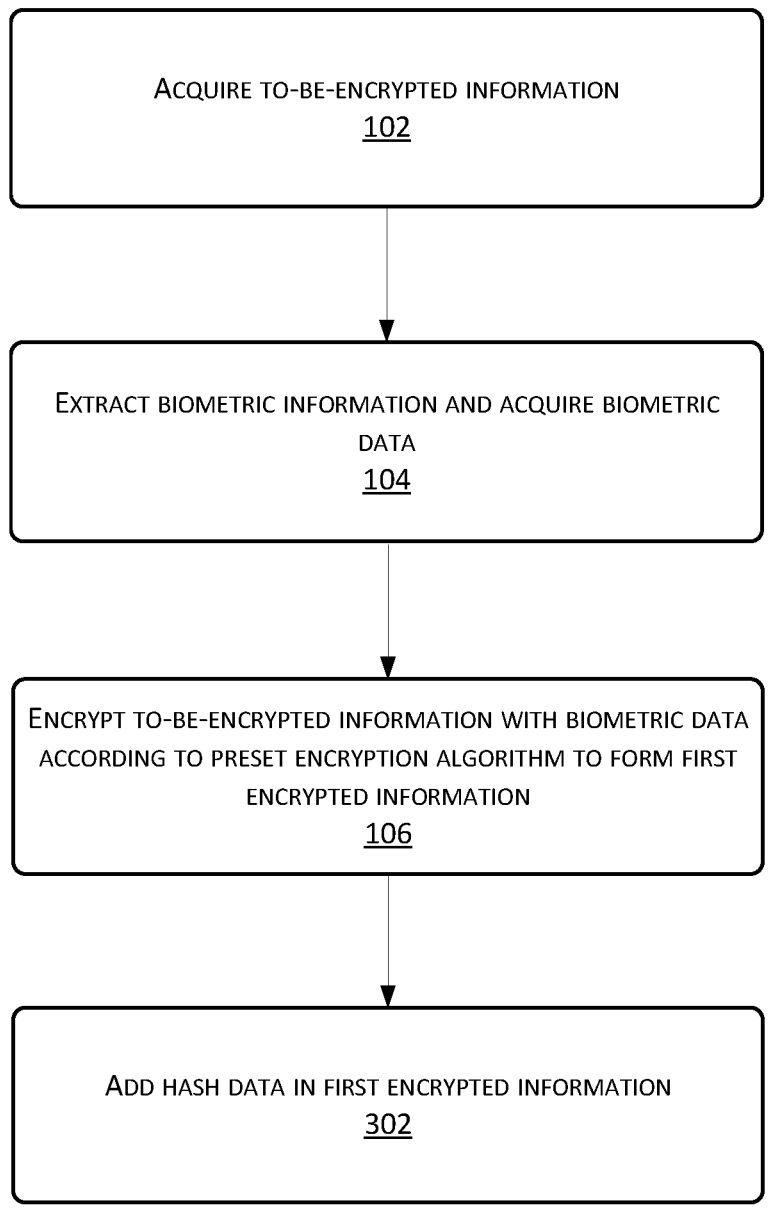
FIG. 3 is a method flow chart of another example embodiment of an information encryption method according to the present disclosure.

In another implementation of the information encryption method of the present disclosure, in order to improve the complexity degree of the encrypted information and the security of the encrypted information, hash data may further be added in the first encrypted information. For example, FIG. 3 is a flow chart of another example embodiment of the information encryption method according to the present disclosure, and as shown in FIG. 3, in addition to the operations as shown in FIG. 1, the information encryption method may further include the following operations.

At 302, hash data is added in the first encrypted information.

For example, the hash data, which is randomly generated or self-defined and has a same structure as that of the encrypted information data, is added to the encrypted first encrypted information, and may be either added to a particular location of the encrypted information, or randomly added to a certain location in the encrypted information. For example, randomly generated hash data (9, 65521) may be added to the encrypted two-dimensional dataset to form new encrypted information. For example, a new two-dimensional dataset $\{(8, 43664), (9, 65521), (10, 83026), (12,$ 140964), . . . , (296, 1951490480)} with the added hash data may be formed. For instance, the added hash data generally may not include a dataset meeting a polynomial relation converted by the to-be-encrypted information. In the present disclosure, more added hash data in the first encrypted information results in better concealment of the encrypted information and higher security. The amount of actually added hash data may be set according to the requirement of information encryption or the requirement of subsequent information decryption.

In the above example embodiment, the hash data may be added in the encrypted first encrypted information, which further improves the security of the encrypted information. Certainly, the hash data may also be added in the first encrypted information formed by adding the check code information in the to-be-encrypted information.

Figure 4:
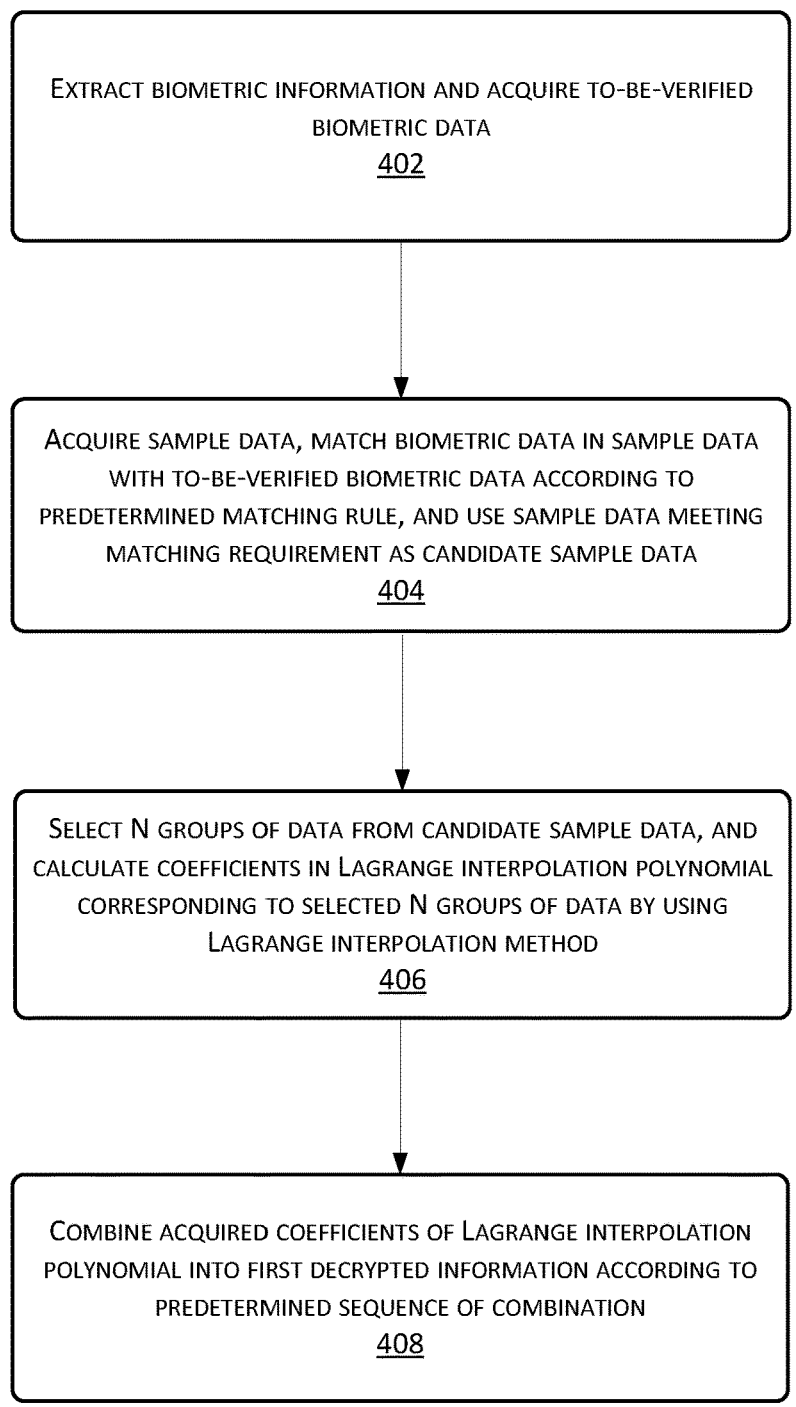
FIG. 4 is a method flow chart of an example embodiment of an information decryption method according to the present disclosure.

According to the method of encrypting data in combination with biometric information provided in the present disclosure, the present disclosure provides an example information decryption method. FIG. 4 is a flow chart of an example embodiment of the information decryption method according to the present disclosure, and as shown in FIG. 4, the information decryption method may include the following operations.

At 402, biometric information is extracted, and to-be-verified biometric data is acquired.

The extraction method of the biometric information and the processing process of acquiring to-be-verified biometric data from the biometric information may refer to 104 in the above information encryption method, which will not be repeated herein. The acquired to-be-verified biometric data may be stored in the form of a unified one-dimensional dataset. For example, the to-be-verified biometric data may be a 128-bit one-dimensional dataset $\{b_1, b_2, b_3 \ldots , b_{128}\}$ acquired by using an intellisense algorithm, such as $b_n=\{8, 10, 13, 13, 14, \ldots , 298\}$.

At 404, encrypted sample data stored in a sample database is acquired, the sample data is matched with the to-be-verified biometric data according to a predetermined matching rule, and sample data meeting a matching requirement is used as candidate sample data.

The sample database may include storage units of sample data acquired by encrypting original information stored in a server or a dedicated database. In the example embodiment, the sample data may include a two-dimensional dataset formed after encrypting the original information. For example, the sample data For example may be sample data $\{(a_1, p(a_1)), (a_2, p(a_2)), (a_3, p(a_3)), \ldots , (a_n, p(a_n))\}$ stored in the sample database, wherein $\{a_1, a_2, a_3 \ldots , a_n\}$ is biometric data in the sample data. In the information decryption method of the example embodiment, the sample data is matched with the to-be-verified biometric data according to a predetermined matching rule, and the sample data meeting a preset matching requirement is used as candidate sample data. For example, the sample data meeting the matching requirement may be included in the sample data in the acquired sample data in which the biometric data has the maximum number of data identical or similar to the to-be-verified biometric data, and correspondingly, the predetermined matching rule may be preset according to the configured matching requirement. For example, in one implementation, the matching biometric data in the sample data with the to-be-verified biometric data according to a predetermined matching rule, and using sample data meeting a matching requirement as candidate sample data may include the following operations.

Operation A: whether data in the to-be-verified biometric data and data in the sample data are identical is compared one by one, and sample data with the maximum number of identical comparison data and a matching degree not less than a preset minimum matching degree is used as the candidate sample data.

For example, the predetermined matching rule may include comparing whether data in the to-be-verified biometric data and data in the sample data are identical one by one, and the matching requirement may include the maximum number of identical comparison data and a matching degree not less than a preset minimum matching degree. In the matching method of the example embodiment, when the comparison indicates that the biometric data in the selected sample data includes all data in the to-be-verified biometric data, it may indicate that the biometric data in the selected sample data and the to-be-verified biometric data belong to the same biometric information of the same biological body. In this case, it may be considered that the extracted to-be-verified biometric data is biometric data for encrypting original information in the sample data, and the sample data may be used as candidate sample data for subsequent information decryption.

For another example, due to the influence of different biometric information extraction methods or different biometric extraction ranges, the to-be-verified biometric data may generally not be identical to the biometric data during information encryption. In this case, sample data with the maximum number of to-be-verified biometric data included in biometric data of the acquired sample data may be used as the candidate sample data. At the same time, to ensure that the biometric data in the candidate sample data and the to-be-verified biometric data meet a certain matching condition, a minimum matching degree may be preset. For instance, when the minimum matching degree is set to be 50%, it may indicate that at least 50% data in the biometric data of the sample data is identical or similar to the data in the to-be-verified biometric data.

In a specific example, at least one sample data stored in a biometric database may be acquired. For example, the acquired first sample data may be a 128-bit tow-dimensional dataset $\{(a_1, p(a_1)), (a_2, p(a_2)), (a_3, p(a_3)), \ldots , (a_{128}, p(a_{128}))\}$, and biometric data in the sample data is a one-dimensional dataset $\{a_1, a_2, a_3 \ldots , a_{128}\}$. The set matching requirement may be that the number of data in the biometric data of the sample data identical to the data in the to-be-verified biometric data is the maximum and the matching degree of the sample data is not less than 89%. During information decryption, fingerprint feature information of the biological body may be extracted by using a fingerprint reader, and the information is processed correspondingly to acquire 128-bit one-dimensional to-be-verified biometric data $\{b_1, b_2, b_3 \ldots , b_{128}\}$. In this case, the biometric data $\{a_1, a_2, a_3 \ldots , a_{128}\}$ in the first sample data and the to-be-verified biometric data $\{b_1, b_2, b_3 \ldots , b_{128}\}$ may be compared for the number of identical data, and the result of comparison is that there are 125 pieces of data in the 128 pieces of biometric data of the sample data identical to those of the to-be-verified biometric data. At the same time, a minimum matching degree may be further set, and the matching degree of the biometric data in the sample data may be calculated by using a formula: matching degree=the number of identical data/the number of to-be-verified biometric data*100%. In this example, the minimum matching degree may be set as 89%, and it may indicate that the biometric data in the sample data at least include 89% data in the to-be-verified biometric data. The number of data in the biometric data $\{a_1, a_2, a_3 \ldots, a_{128}\}$ of the selected first sample data that includes the data of the to-be-verified biometric data is 125, and the matching degree is 97.66%, greater than the set minimum matching degree 89%. At the same time, the number of data in the biometric data of other subsequently selected sample data that includes the data of the to-be-verified biometric data is less than 125, and therefore, the first sample data meets the preset matching requirement, and the first sample data may be selected as the candidate sample data.

In another implementation, the operations of matching biometric data in the sample data with the to-be-verified biometric data according to a predetermined matching rule, and using sample data meeting a matching requirement as candidate sample data may select the candidate sample data according to a difference between the biometric data in the sample data and the to-be-verified biometric data, which may include the following operations.

Operation B: a difference between the biometric data in the sample data and the to-be-verified biometric data is calculated by using the following formula:

$$m = \sum_{i=1}^{n} |a_i - b_i| \qquad (2)$$

In the above formula (2), m may indicate the difference between the biometric data in the sample data and the to-be-verified biometric data, n may indicate the number of data in the to-be-verified biometric data, $a_i$ may indicate the $i^{th}$ data of the biometric data in the sample data, and $b_i$ may indicate the $i^{th}$ data in the to-be-verified biometric data.

By using the above formula, a difference between biometric data of different sample data and the to-be-verified biometric data may be calculated. For example, the acquired to-be-verified biometric data is b={12, 14, 16, 18, 20, 22, 24, 26, 28, 30}, biometric data in acquired second sample data is a={12, 13, 16, 18, 21, 22, 23, 26, 29, 30}, and, by using the above formula (2), a difference between the biometric data a and the to-be-verified biometric data b is 4. Certainly, the difference may also be calculated by using other formulas, which may indicate the difference between the biometric data in the sample data and the to-be-verified biometric data, such as the following formula (3):

$$m = \sum_{i=1}^{n} (a_i - b_i)^2 \qquad (3)$$

In the above formula (3), m may indicate the difference between the biometric data in the sample data and the to-be-verified biometric data, n may indicate the number of data in the biometric data and the to-be-verified biometric data, $a_i$ may indicate the $i^{th}$ data of the biometric data in the sample data, and $b_i$ may indicate the $i^{th}$ data in the to-be-verified biometric data.

Operation C: sample data with the minimum difference from the to-be-verified biometric data and the difference from the to-be-verified biometric data not greater than a preset maximum error value is selected as the candidate sample data.

Likewise, differences between the biometric data of the acquired other sample data and the to-be-verified biometric data may also be calculated by using the above formula (2) or (3), and sample data with the minimum difference may be selected as the candidate sample data. At the same time, to ensure that a deviation between the biometric data in the selected candidate sample data and the to-be-verified biometric data is in a reasonable range, a maximum error value for the difference may be set. For example, the maximum error value may be set to be 100, and a difference m between the biometric data a of the selected second sample data and the to-be-verified biometric data b calculated by using the formula (2) is 4, less than the maximum error value 100, and differences between biometric data of subsequently selected other sample data and the to-be-verified biometric data b are all greater than 4; therefore, the second sample data may be selected as the candidate sample data.

For another example, the selected sample data may include the hash data, and therefore, the number of biometric data included in the selected sample data may be greater than the number of the to-be-verified biometric data, and in this case, the candidate sample data may be selected by using the method of Operation A.

In another information decryption method provided in the present disclosure, a matching degree between the biometric data in the sample data and the to-be-verified biometric data may be judged according to the difference between the biometric data in the sample data and the to-be-verified biometric data. Since the number of data in the biometric data in the sample data and the number of data in the to-be-verified biometric data may be different, in case of difference calculation, k pieces of data around the biometric data in the sample data having the same location as selected to-be-verified biometric data are compared with the to-be-verified biometric data, and a difference with the minimum absolute value is used as the difference between the biometric data of the sample data and the selected to-be-verified biometric data. Differences between the biometric data of the sample data and all data in the to-be-verified biometric data may be calculated sequentially, and then a sum of absolute values of all the differences may be used. For example, the difference between the biometric data in the sample data and the to-be-verified biometric data may be calculated by using the following formula:

$$m = \sum_{i=1}^{n} \min(|a_{i+j} - b_i|) \qquad (4)$$
$$-t \le j \le t$$

In the above formula (4), m may indicate the difference between the biometric data in the sample data and the to-be-verified biometric data, n may indicate the number of data in the to-be-verified biometric data, $b_i$ may indicate the $i^{th}$ data of the to-be-verified biometric data, $a_{i+j}$ may indicate the $(i+j)^{th}$ data of the biometric data in the sample data, t may indicate a set offset, and $\min(|a_{i+j} - b_i|)$ may indicate a minimum of absolute values of differences between data, within a range before and after t pieces of the $i^{th}$ biometric data in the sample data, and the $i^{th}$ data in the to-be-verified biometric data among data.

For example, the acquired biometric data of the sample data is a={12, 13, 16, 18, 21, 24, 26, 29, 30}, the acquired to-be-verified biometric data is b={12, 14, 18, 20, 26, 28}, and a set offset t is 3. When a difference between the to-be-verified biometric data $b_2=14$ and the biometric data of the sample data is calculated, absolute values of differences between data, within the range before and after $a_2=13$ by 3 offset, and $b_2=14$, that is, absolute values of differences between $a_1=12$, $a_2=13$, $a_3=16$, $a_4=18$, $a_5=21$ and $b_2=14$ are compared, which are 2, 1, 2, 4, 7 respectively. The minimum absolute value 1 of the difference is selected as a difference between the biometric data of the sample data and the to-be-verified biometric data $b_2$=14. Absolute values of differences between all data in the to-be-verified biometric information b and the biometric data in the sample data may be calculated sequentially according to the above method, and the absolute values are added to acquire the difference m between the biometric data of the sample data and the to-be-verified biometric data.

Certainly, referring to other example embodiments of the present disclosure, the formula of calculating the difference between the biometric data in the sample data and the to-be-verified biometric data may be deformed correspondingly. For example, the formula for calculating the difference may also be:

$$m = \sum_{i=1}^{n} \min(a_{i+j} - b_i)^2 \quad (5)$$
$$-t \le j \le t \text{ or}$$

$$m = \sum_{i=1}^{n} (\min(|a_{i+j} - b_i|))^2 \quad (6)$$
$$-t \le j \le t$$

Like the above example embodiment, after the difference between the biometric data of the acquired sample data and the to-be-verified biometric data is calculated, sample data with the minimum difference and the difference not greater than a preset maximum error value may be selected as the candidate sample data.

After encrypted sample data stored in a sample database is acquired, the sample data may be matched with the to-be-verified biometric data according to a predetermined matching rule, and sample data meeting a matching requirement is used as candidate sample data.

At 406, N groups of data are selected from the candidate sample data, and coefficients in a Lagrange interpolation polynomial corresponding to the selected N groups of data are calculated by using a Lagrange interpolation method, N being a preset number of groups of selected data.

Generally, in the preset N, N−1 is the highest power of a variable in a Lagrange interpolation formula, and the number N of the selected datasets is not greater than the number L of datasets included in the sample data, that is, N≤L.

The Lagrange interpolation method may be a polynomial interpolation method, and in the method, if a function value at N independent variables $x_1, x_2, \ldots, x_N$ of a certain polynomial function is known as $y_1, y_2, \ldots, y_N$, a Lagrange interpolation polynomial $$f(x) = \sum_{j=0}^{N} y_j p_j(x)$$

passing the N points and having the power less than N−1 may be constructed, wherein $p_j(x)$ is a Lagrange basic polynomial, and an expression thereof may be:

$$p_j(x) = \prod_{i=1, i \ne j}^{N} \frac{x - x_i}{x_j - x_i} = \frac{(x-x_1)(x-x_2)\ldots(x-x_N)}{(x_j-x_1)(x_j-x_2)\ldots(x_j-x_N)}, \quad (7)$$
$$i, j = 1, 2, \ldots, N$$

For example, $\{a_1, a_2, a_3 \ldots, a_n\}$ in the sample data $\{(a_1, p(a_1)), (a_2, p(a_2)), (a_3, p(a_3)), \ldots, (a_n, p(a_n))\}$ may be substituted into the independent variable x of the formula (7), and $\{p(a_1), p(a_2), p(a_3), \ldots, p(a_n)\}$ in the sample data is used as a polynomial value of the formula (7) corresponding to the independent variable x, and therefore, N Lagrange basic polynomials may be constructed, and polynomial coefficients of f(x) may be acquired by using the constructed N Lagrange basic polynomials and the Lagrange interpolation polynomial.

A specific application example is used to describe the process of calculating Lagrange interpolation polynomial coefficients corresponding to selected N groups of sample data by using the Lagrange interpolation method of the embodiment. For example, the selected sample data may be $\{(1, 6), (5.25, 5), (10, 4)\}$, and three groups of data in the sample data may be expressed as the correspondence of the following polynomial $y_j=y(x)$:

$$y(1)=6, y(5.25)=5, y(10)=4,$$

Further, three Lagrange basic polynomials may be acquired according to the formula (7), which are respectively:

$$p_1(x) = \frac{(x-5)(x-6)}{(4-5)(4-6)}$$

$$p_2(x) = \frac{(x-4)(x-6)}{(5-4)(5-6)}$$

$$p_3(x) = \frac{(x-4)(x-5)}{(6-5)(6-5)}$$

Then, the expression of f(x) may be acquired by using the Lagrange interpolation polynomial $$f(x) = \sum_{j=0}^{N} y_j p_j(x):$$

$$f(x) = y(4)p_1(x) + y(5)p_2(x) + y(6)p_3(x)$$
$$= 10 * \frac{(x-5)(x-6)}{(4-5)(4-6)} + 5.25 * \frac{(x-4)(x-6)}{(5-4)(5-6)} + 1 * \frac{(x-4)(x-5)}{(6-4)(6-5)}$$
$$= 0.25x^2 - 7x + 34$$

By using the polynomial of the f(x) acquired through calculation, the coefficients of the polynomial may be acquired, which is (0.25, −7, 34).

N groups of data selected from the candidate sample data is substituted into the formula of the Lagrange interpolation polynomial to calculate coefficients in the Lagrange interpolation polynomial corresponding to the groups of data.

At 408, the acquired coefficients of the Lagrange interpolation polynomial are combined into first decrypted information according to a predetermined sequence of combination.

After the coefficients of the Lagrange interpolation polynomial are acquired by using the Lagrange interpolation method, coefficients of monomials in the Lagrange interpolation polynomial may be recombined according to a predetermined combination sequence to form the decrypted first decrypted information. For example, by rearranging from high to low according to the power of variables of the monomials corresponding to the coefficients, the first decrypted information may be formed. For instance, the Lagrange interpolation polynomial acquired by calculation is $f(x)=75x^3+73x^2+65x^1+72x^0$, and the coefficients may be recombined according to a reduced power order of the variable x to acquire first decrypted information: 75736572.

In an information decryption method provided in the present disclosure, the biometric data may be extracted by using a biometric extraction apparatus to acquire to-be-verified biometric data, the to-be-verified biometric data is matched with the sample data according to a predetermined matching rule, and sample data meeting a matching requirement is used as candidate sample data to perform information decryption. In the process of information decryption, the Lagrange interpolation method may be used to reversely acquire the expression of the polynomial when values of an independent variable and a dependent variable of the polynomial are known, and coefficients of the Lagrange interpolation polynomial may be acquired, thereby acquiring encrypted information to complete the decryption of the information. In the decryption method of the present disclosure, during information decryption, the Lagrange interpolation method is used to reversely acquire corresponding coefficients of subsequent sample data, and in the process of decryption, the biometric information for the encryption needs to be combined, such that the encrypted information will not be cracked easily and illegally, which improves the difficulty in illegal cracking of the information.

Figure 5:
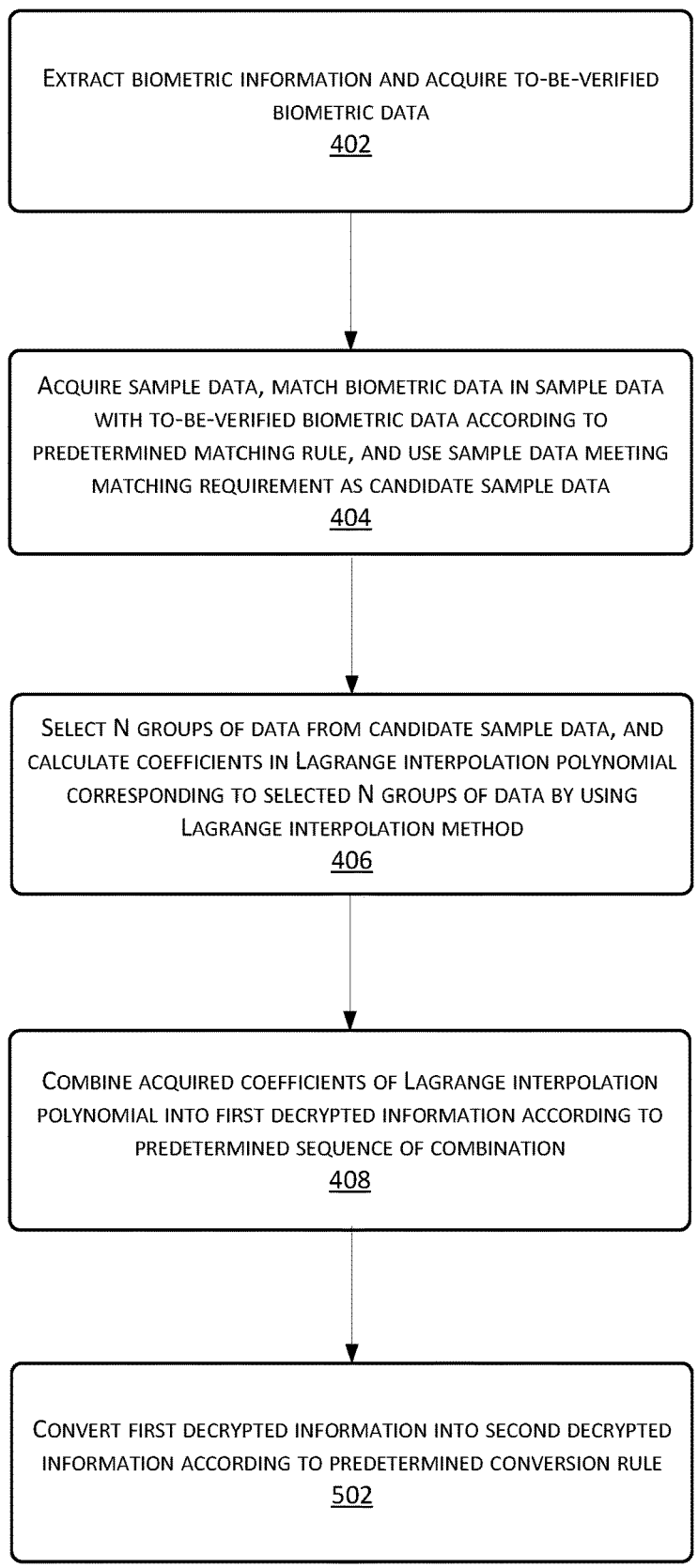
FIG. 5 is a method flow chart of another example embodiment of an information decryption method according to the present disclosure.

In another example embodiment of information decryption, original information in candidate sample data is segmented during encryption, and is converted by a predetermined coding format into a first preset data format. For example, to-be-encrypted information is segmented into k segments, and each segment of the to-be-encrypted information is converted into hexadecimal first preset data format as coefficients of a monomial corresponding to the segment. During information decryption, the acquired first decrypted information may be the first preset data format of the original information, and in this case, the first encrypted information is further converted, by using corresponding conversion, into the predetermined coding data format. FIG. 5 shows another example embodiment of the information decryption method according to the present disclosure, and as shown in FIG. 5, in addition to the operations as shown in FIG. 4, the method may further include the following operation:

At 502, the first decrypted information is converted into second decrypted information according to a predetermined conversion rule.

For example, the acquired first decrypted information is 75736572, and coefficients of corresponding monomials are 75, 73, 65, 72 respectively. For the first decrypted information, every 8-bit binary data of the binary to-be-encrypted information is converted into 2-bit hexadecimal data from high-bit to low-bit, and therefore, according to a predetermined conversion rule, every 2-bit hexadecimal data of the first decrypted information 75736572 may be converted into 8-bit binary data from high-bit to low-bit, thereby acquiring the second decrypted information after the conversion: 01110101011100110110010101110010. Certainly, the method for processing the original information during the encryption may be different, and therefore, the predetermined conversion rule of the first decrypted information may also be different, and the acquired second decrypted information after the conversion may also be different. For example, when the first decrypted information 75736572 is decimal data, according to the predetermined conversion rule, the acquired second decrypted information may be 01001011010010010100000101001000.

Figure 6:
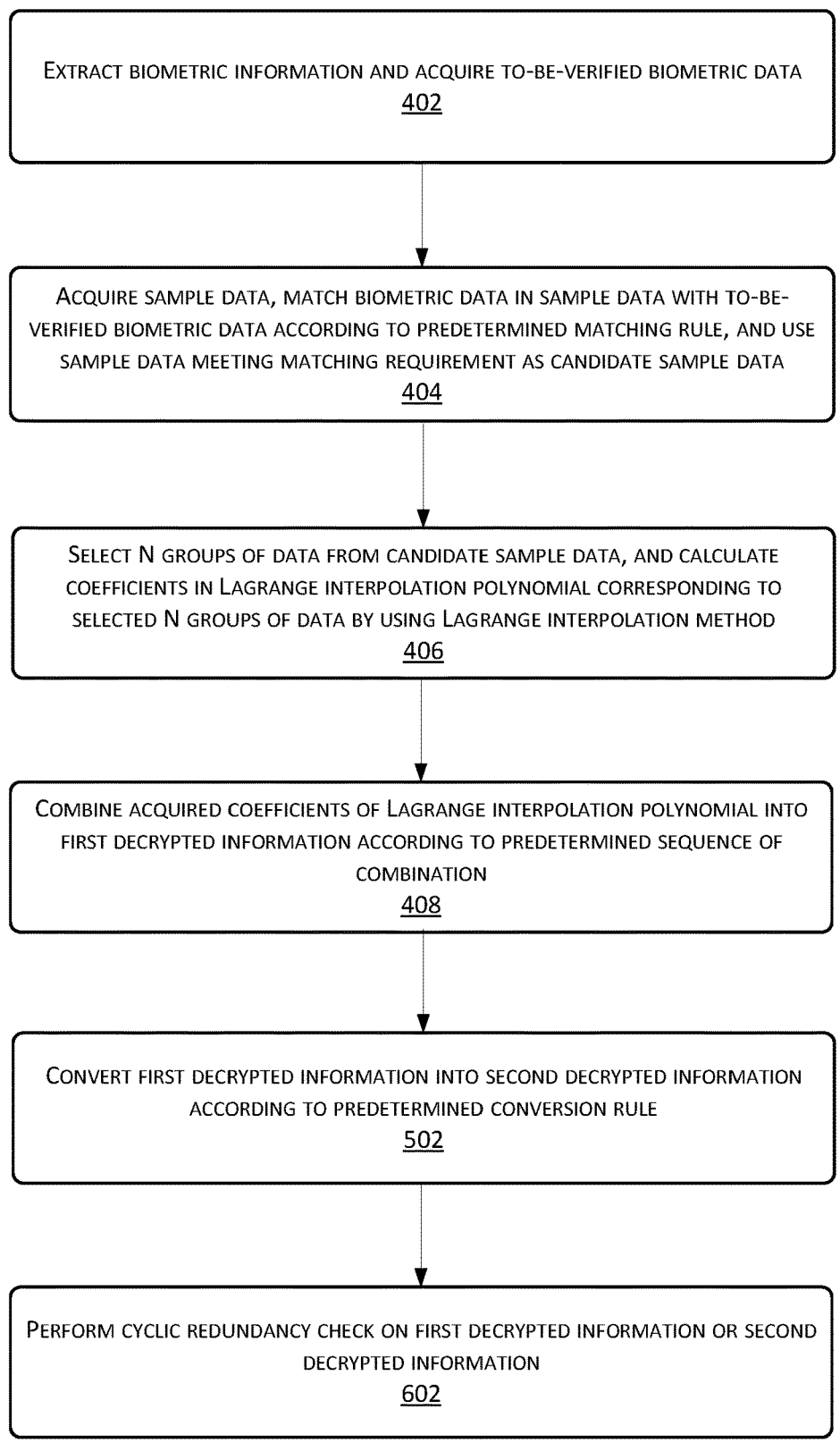
FIG. 6 is a method flow chart of another example embodiment of an information decryption method according to the present disclosure.

In another example embodiment of an information decryption method of the present disclosure, the first decrypted information or the second decrypted information may be verified to verify correctness of the decrypted information. For example, CRC may be used. In the above process of information encryption, a check code may be added in the to-be-encrypted information, for example, 8 may be added at the end of the to-be-encrypted information as a binary CRC, for verifying correctness of the decrypted information during information decryption. FIG. 6 is another example embodiment of the information decryption method according to the present disclosure, and as shown in FIG. 6, in addition to the operations as shown in FIG. 5, the method may further include the following operation:

At 602, a CRC is performed on the first decrypted information or second decrypted information.

The CRC may generally be a method for verifying reliability of information by using a check code having the fixed number of digits to detect or verify whether there is an error in data after being transmitted, stored or decrypted. After the first decrypted information or second decrypted information is acquired, the first decrypted information or second decrypted information may be verified by using the check data selected during the information encryption. For example, the acquired second decrypted information is 10111010111, the selected check data is 10101. If the second decrypted information 10111010111 is module-2 divided by the check data 10101, a remainder is 0, which indicates that the acquired second encrypted information passes the verification, and is the correct original data. If the second decrypted information may not be module-2 divided by the check data and the remainder is not zero, it may indicate that the information has an error during transmission or storage, the acquired second decrypted information does not pass the verification, and the second decrypted information is not the correct original data.

For example, the decrypted information may be further checked by using a CRC to determine whether the acquired decrypted information is the original encrypted information, and by using the method of the embodiment, the reliability of data acquired after information decryption may be improved.

Figure 7:
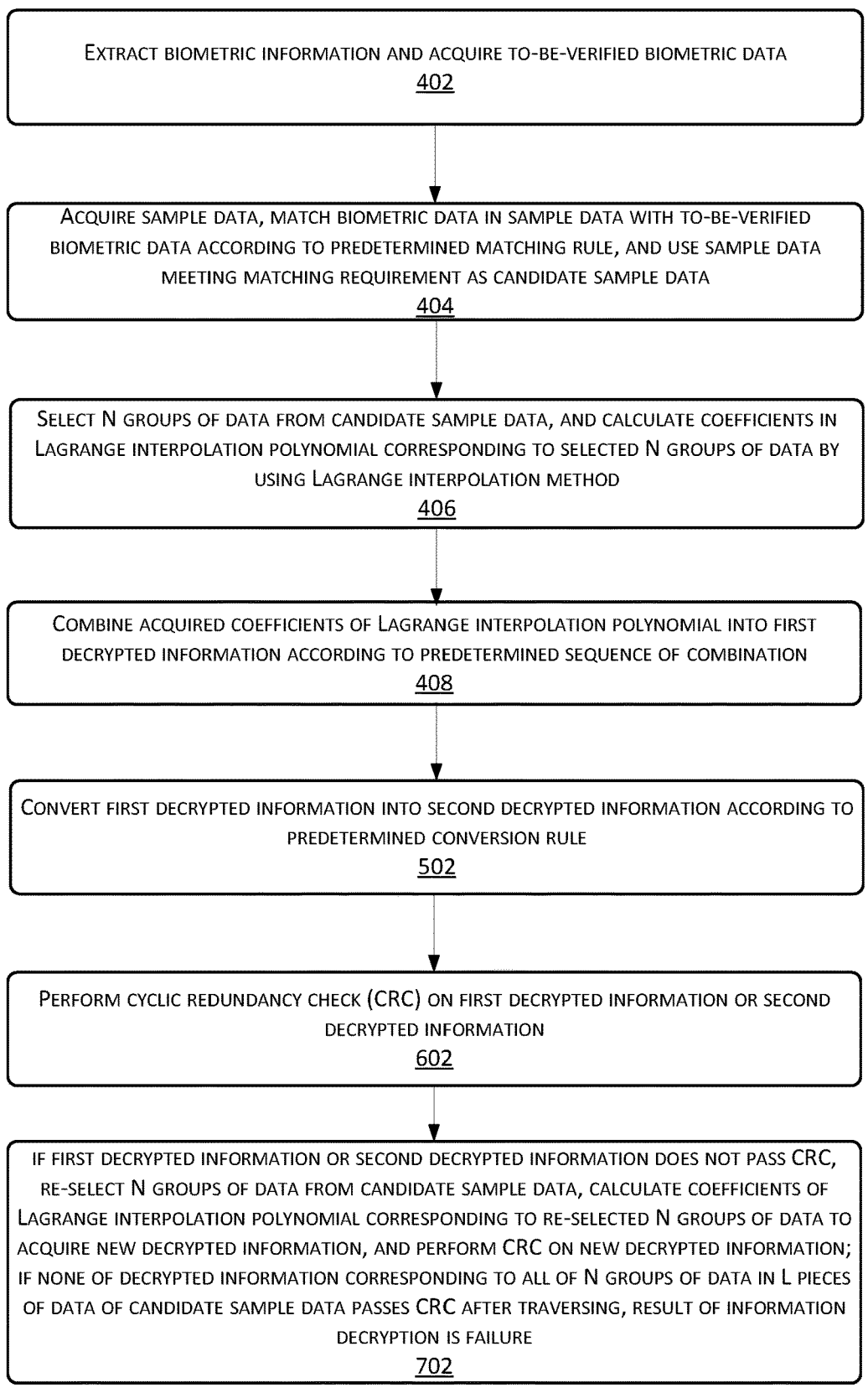
FIG. 7 is a method flow chart of another example embodiment of an information decryption method according to the present disclosure.

In another example embodiment of the information decryption method of the present disclosure, when hash data is added in the acquired candidate sample data, the CRC method may be used to check the first decrypted information or the second decrypted information, and if the first decrypted information or the second decrypted information does not pass the check, N groups of data in the candidate sample data may be re-selected for calculation to acquire new decrypted information. If the new decrypted information still does not pass the check, another N groups of data will be selected, until all N groups of data in the candidate sample data are traversed. FIG. 7 is another embodiment of the information decryption method according to the present disclosure, and as shown in FIG. 7, in addition to operations as shown in FIG. 6, the information decryption method may further include the following operation:

At 702, if the first decrypted information or second decrypted information does not pass the CRC, N groups of data from the candidate sample data are re-selected, coefficients of a Lagrange interpolation polynomial corresponding to the re-selected N groups of data are calculated to acquire new decrypted information, and a CRC is performed on the new decrypted information; if none of the decrypted information corresponding to all of the N groups of data in L pieces of data of the candidate sample data passes the cyclic redundancy check after the traversing, the result of the information decryption is a failure.

When the candidate sample data includes hash data, the number L of datasets included in the candidate sample data is generally greater than the number of biometric data during the information encryption. Generally, the number N of groups of data selected from the candidate sample data may be the number of coefficients in the Lagrange interpolation polynomial. As the candidate sample data may include the hash data, the selected N (N≤L) groups of data may also include the hash data, when the first decrypted information or the second decrypted information is acquired, the techniques of the present disclosure may further verify whether the first decrypted information or the second decrypted information is the encrypted original information. If the first decrypted information or second decrypted information does not pass the cyclic redundancy check, for example, an acquired remainder during check by using the CRC is not 0, N groups of data is re-selected to calculate coefficients of a Lagrange interpolation polynomial corresponding to the re-selected N groups of data to acquire new decrypted information. Then the new decrypted information is conducted verification. If none of new decrypted information corresponding to all combinations of N groups of data in the L datasets in the candidate sample data passes the verification after the traversing, it may indicate that the candidate sample data may not be decrypted by using the to-be-decrypted biometric data, and the result of information decryption by using the to-be-decrypted biometric data is a failure.

Figure 8:
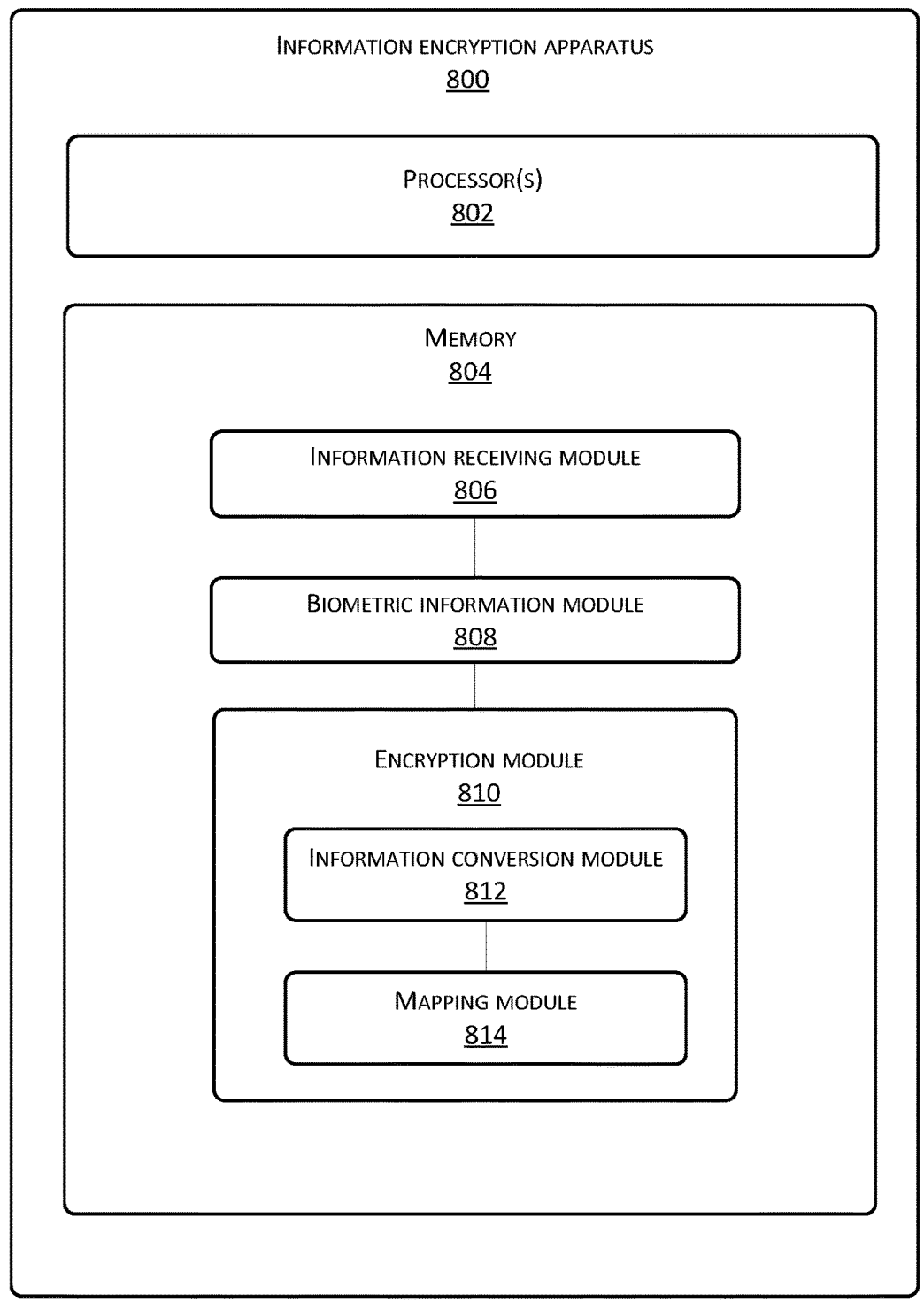
FIG. 8 is a module structural diagram of an example embodiment of an information encryption apparatus according to the present disclosure.

Based on the information encryption method of the present disclosure, the present disclosure provides an example information encryption apparatus. The information encryption apparatus may include the form of an application formed by computer software, and a client terminal or server performing the information encryption may include the application. Alternatively, the information encryption apparatus may include an entity apparatus formed by corresponding hardware or hardware plus software. FIG. 8 is a module structural diagram of an example embodiment of an information encryption apparatus 800 of the present disclosure. As shown in FIG. 8, an information encryption apparatus 800 includes one or more processor(s) 802 or data processing unit(s) and memory 804. The information encryption apparatus 800 may further include one or more input/output apparatuses and network interfaces (not shown in FIG. 8). The memory 804 is an example of computer-readable media.

The computer-readable media includes permanent and non-permanent, movable and non-movable media that may use any methods or techniques to implement information storage. The information may be computer-readable instructions, data structure, software modules, or any data. The example of computer storage media may include, but is not limited to, phase-change memory (PCM), static random access memory (SRAM), dynamic random access memory (DRAM), other type RAM, ROM, electrically erasable programmable read only memory (EEPROM), flash memory, internal memory, CD-ROM, DVD, optical memory, magnetic tape, magnetic disk, any other magnetic storage device, or any other non-communication media that may store information accessible by the computing device.

As defined herein, the computer-readable media does not include transitory media such as a modulated data signal and a carrier wave.

The memory 804 may store therein a plurality of modules or units including: an information receiving module 806 that acquires to-be-encrypted information; a biometric information module 808 that extracts biometric information, and acquire biometric data; and an encryption module 810 that encrypts to-be-encrypted information with the biometric data according to a preset encryption algorithm to form first encrypted information.

As shown in FIG. 8, for example, the encryption module 810 may include: an information conversion module 812 that convert the to-be-encrypted information into a polynomial of a predetermined format; and a mapping module 814 that substitutes the biometric data into the polynomial for calculation to acquire a value of the polynomial, and forms first encrypted information based on two-dimensional data including the biometric data and the value of the polynomial corresponding to the biometric data.

Figure 9:
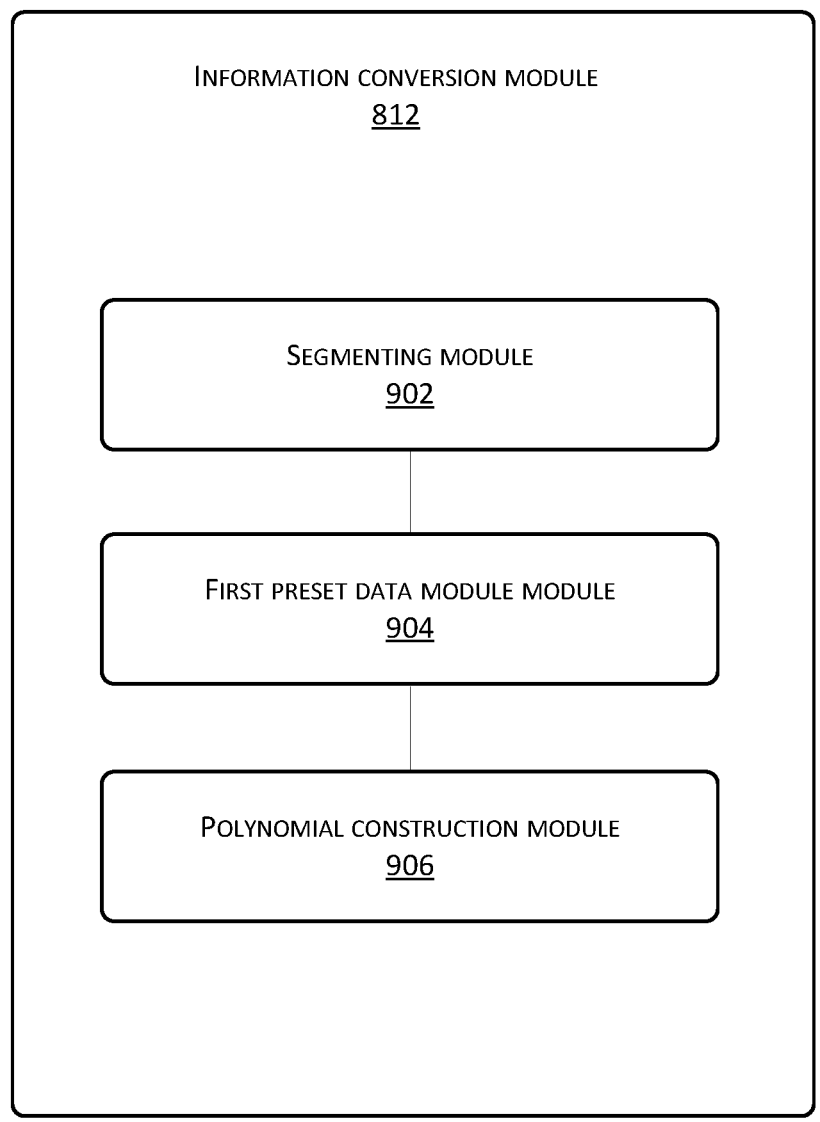
FIG. 9 is a module structural diagram of an example embodiment of an information conversion module of an information encryption apparatus according to the present disclosure.

For example, FIG. 9 shows a schematic diagram of the information conversion module 812 in the information encryption apparatus, and as shown in FIG. 9, the information conversion module 812 may include: a segmenting module 902 that segments the to-be-encrypted information into k segments, and express the to-be-encrypted information after the segmentation by monomials $a_1 * x^{\wedge}(k-1)$, $a_2 * x^{\wedge}(k-2)$, $a_k * x^{\wedge} 0$ from high-bit to low-bit respectively; a first preset data module 904 that converts each segment of the to-be-encrypted information after the segmentation into a first preset data format, and uses the to-be-encrypted information of the first preset data format after the conversion as coefficients of a monomial corresponding to the segment; and a polynomial construction module 906 that constructs a polynomial based on monomials of the k segments using the to-be-encrypted information of the first preset data format as coefficients.

Figure 10:
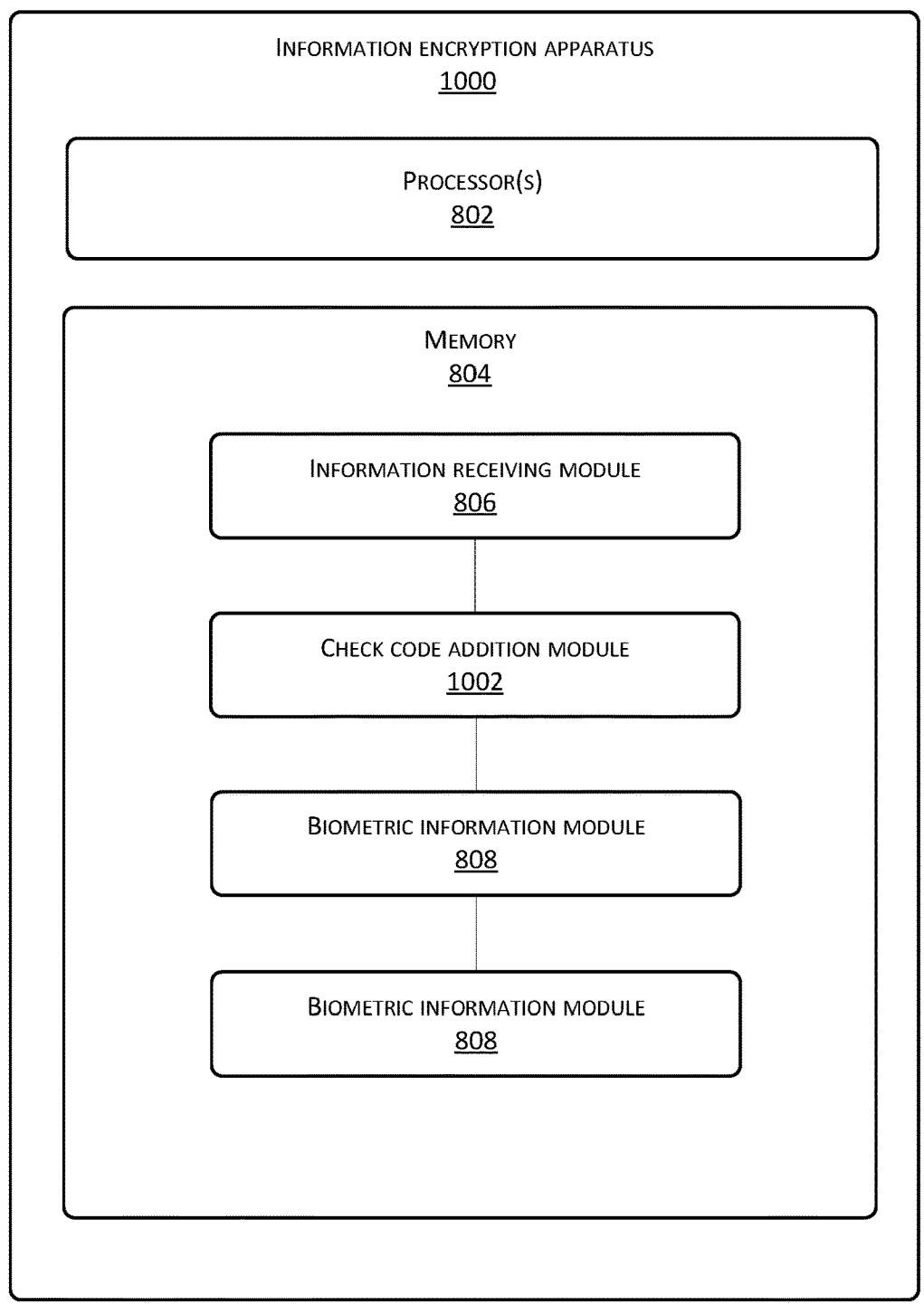
FIG. 10 is a module structural diagram of another example embodiment of an information encryption apparatus according to the present disclosure.

FIG. 10 is a module structural diagram of another example embodiment of the information encryption apparatus of the present disclosure, and as shown in FIG. 10, an information encryption apparatus 1000 may include one or more processor(s) 802 or data processing unit(s) and memory 804. The information encryption apparatus 800 may further include one or more input/output apparatuses and network interfaces (not shown in FIG. 10).

The memory 804 may store therein a plurality of modules or units including the information receiving module 806, the biometric information module 808, and the encryption module 810.

As shown in FIG. 10, the memory 804 may further store therein a check code addition module 1002 that generates a check code, and adds check code information in the to-be-encrypted information.

Correspondingly, the operation that the information conversion module 812 converts the to-be-encrypted information into the polynomial of the predetermined format may include: converting the to-be-encrypted information with the added check code into the polynomial of the predetermined format.

Figure 11:
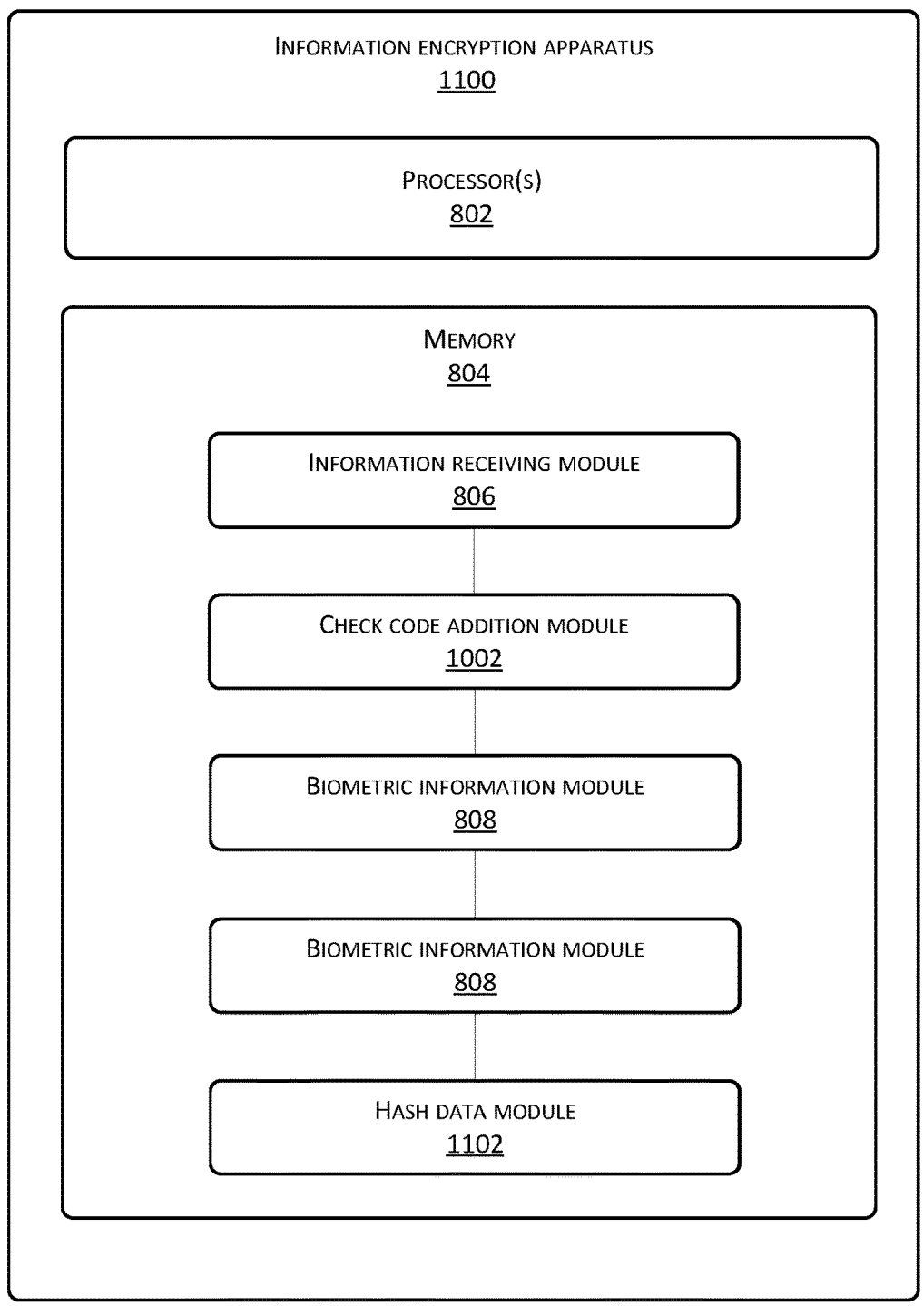
FIG. 11 is a module structural diagram of another example embodiment of an information encryption apparatus according to the present disclosure.

FIG. 11 is a module structural diagram of another example embodiment of the information encryption apparatus, and as shown in FIG. 11, an information encryption apparatus 1100 may include one or more processor(s) 802 or data processing unit(s) and memory 804. The information encryption apparatus 800 may further include one or more input/output apparatuses and network interfaces (not shown in FIG. 11).

The memory 804 may store therein a plurality of modules or units including the information receiving module 806, the biometric information module 808, the encryption module 810, and the check code addition module 1002.

As shown in FIG. 11, the memory 804 may further store therein a hash data module 1102 that generates hash data, and adds the hash data to the first encrypted information.

The data format of the generated hash data may be the same as the data format of the first encrypted information.

Figure 12:
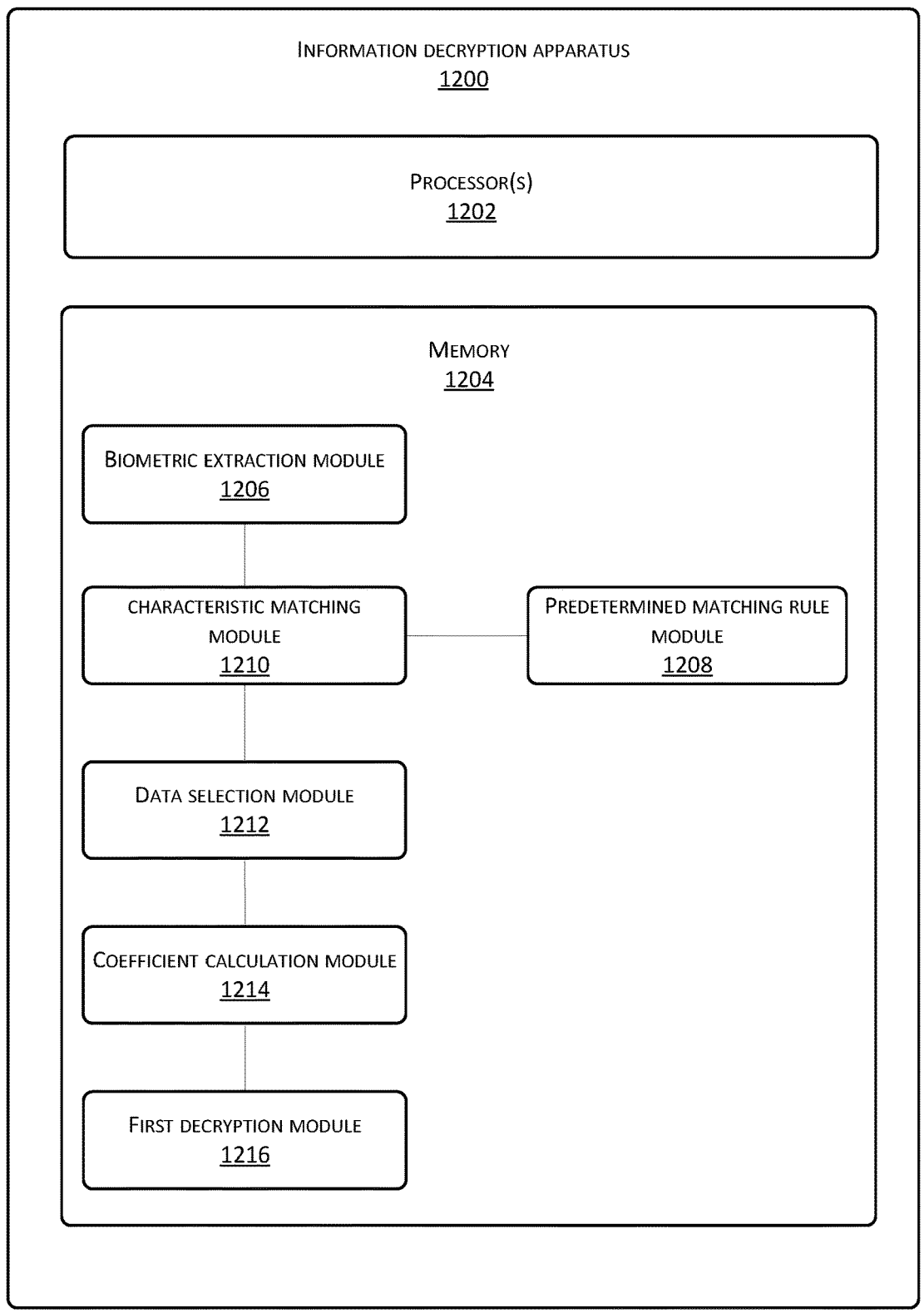
FIG. 12 is a module structural diagram of an example embodiment of an information decryption apparatus according to the present disclosure.

Based on the information decryption method of the present disclosure, the present disclosure provides an information decryption apparatus. Like the information encryption method, the information decryption apparatus of the present disclosure may include the form of an application formed by computer software, and a client or server performing the information decryption may include the application. Alternatively, the information decryption apparatus may include an entity apparatus formed by corresponding hardware or in a form of hardware plus software. FIG. 12 is a module structural diagram of an example embodiment of the information decryption apparatus, and as shown in FIG. 12, an information decryption apparatus 1200 may include one or more processor(s) 1202 or data processing unit(s) and memory 1204. The information encryption apparatus 1200 may further include one or more input/output apparatuses and network interfaces (not shown in FIG. 12). The memory 1204 is an example of computer-readable media.

The memory 1204 may store therein a plurality of modules or units including: a biometric extraction module 1206 that extracts biometric information, and acquires to-be-verified biometric data; a predetermined matching rule module 1208 that stores a preset predetermined matching rule of sample data and to-be-verified biometric data, and a matching requirement of candidate sample data; a characteristic matching module 1210 that acquires sample data stored in a sample database, and selects candidate sample data according to the predetermined matching rule and the matching requirement; a data selection module 1212 that select Ns groups of data from the selected candidate sample data, N being the preset number of groups of selected data; a coefficient calculation module 1214 that calculates coefficients in a Lagrange interpolation polynomial corresponding to the selected N groups of data by using a Lagrange interpolation method; and a first decryption module 1216 that combines the acquired coefficients of the Lagrange interpolation polynomial into first decrypted information according to a predetermined sequence of combination.

In another example embodiment of the information decryption apparatus, the predetermined matching rule and the matching requirement of the candidate sample data stored in the predetermined matching rule module 1208 may include that: the predetermined matching rule may include comparing whether data in the to-be-verified biometric data and data in the sample data are identical one by one; and the matching requirement of the candidate sample data may include: using sample data with the maximum number of identical comparison data and a matching degree not less than a preset minimum matching degree as the candidate sample data.

In another example embodiment of the information decryption apparatus, the predetermined matching rule and the matching requirement of the candidate sample data stored in the predetermined matching rule module 1208 may include that: the matching rule may include calculating a difference between the biometric data in the sample data and the to-be-verified biometric data by using the following formula:

$$m = \sum_{i=1}^{n} |a_i - b_i| \text{ or,}$$

$$m = \sum_{i=1}^{n} (a_i - b_i)^2 \text{ or,}$$

$$m = \sum_{i=1}^{n} \min(|a_{i+j} - b_i|)$$

$$-t \le j \le t \text{ or,}$$

$$m = \sum_{i=1}^{n} \min(a_{i+j} - b_i)^2$$

$$-t \le j \le t \text{ or,}$$

$$m = \sum_{i=1}^{n} (\min(|a_{i+j} - b_i|))^2$$

$$-t \le j \le t$$

in the above formulas, m indicates the difference between the biometric data in the sample data and the to-be-verified biometric data, n indicates the number of data in the to-be-verified biometric data, $a_i$ indicates the $i^{th}$ data of the biometric data in the sample data, $b_i$ indicates the $i^{th}$ data of the to-be-verified biometric data, $a_{i+j}$ indicates the $(i+j)^{th}$ data of the biometric data in the sample data, and t indicates a set offset; and the matching requirement of the sample data may include using sample data with the minimum difference from the to-be-verified biometric data and the difference not greater than a preset maximum error value as the candidate sample data.

Figure 13:
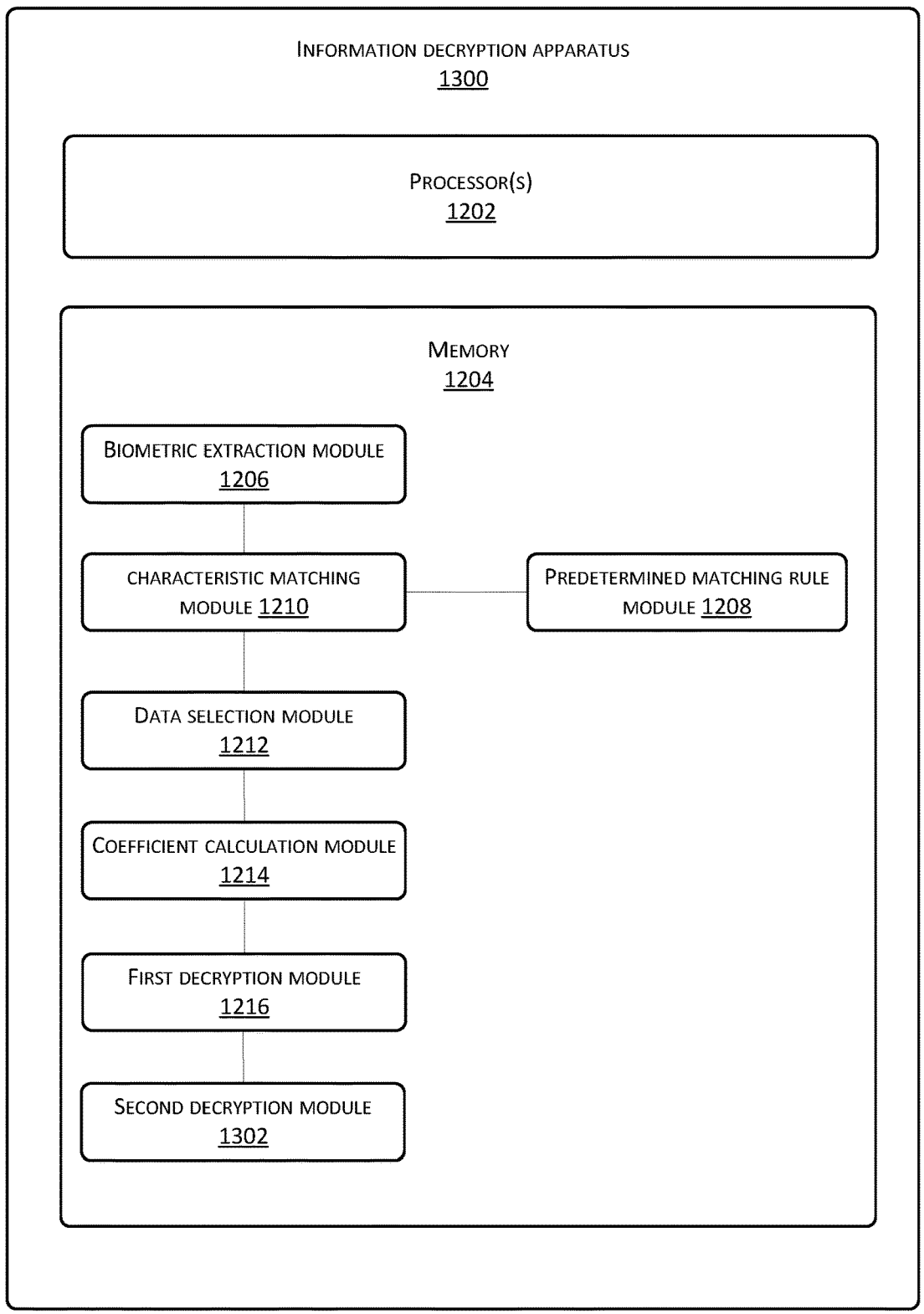
FIG. 13 is a module structural diagram of another example embodiment of an information decryption apparatus according to the present disclosure.

FIG. 13 is a module structural diagram of another example embodiment of the information decryption apparatus, and as shown in FIG. 13, an information decryption apparatus 1300 may include more processor(s) 1202 or data processing unit(s) and memory 1204. The information encryption apparatus 1300 may further include one or more input/output apparatuses and network interfaces (not shown in FIG. 13).

The memory 1204 may store therein a plurality of modules or units including a biometric extraction module 1206, a predetermined matching rule module 1208, a characteristic matching module 1210, a data selection module 1212, a coefficient calculation module 1214, and a first decryption module 1216.

As shown in FIG. 13, the memory 1204 may further store therein a second decryption module 1302 that convert the first decrypted information into second decrypted information according to a stored predetermined conversion rule.

The predetermined conversion rule may be set according to the processing process of the original data during the information encryption to be used to convert the first decrypted information into second decrypted information of the original information.

Figure 14:
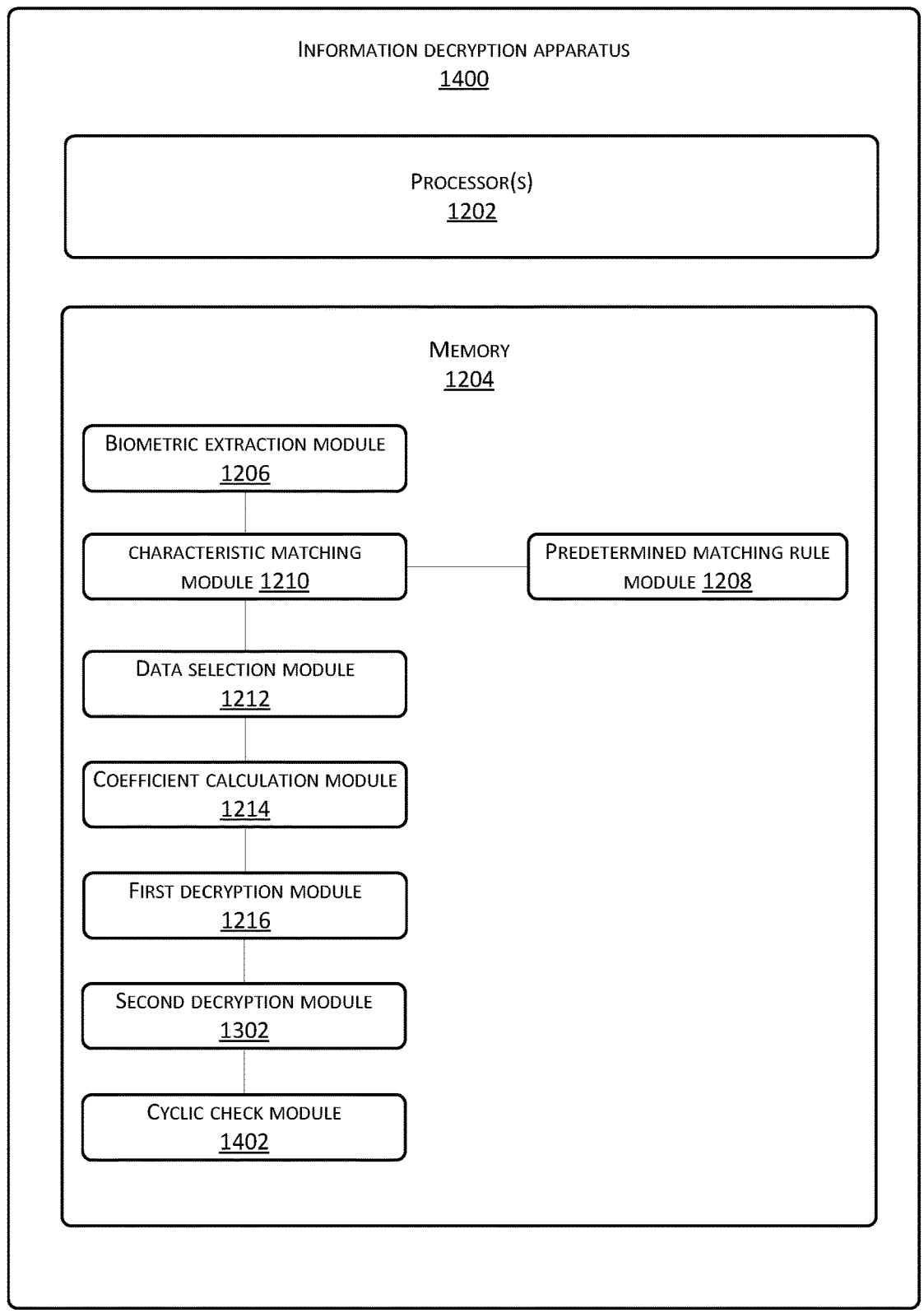
FIG. 14 is a module structural diagram of another example embodiment of an information decryption apparatus according to the present disclosure.

FIG. 14 is a module structural diagram of another example embodiment of the information decryption apparatus, and as shown in FIG. 14, an information decryption apparatus 1400 may include more processor(s) 1202 or data processing unit(s) and memory 1204. The information encryption apparatus 1400 may further include one or more input/output apparatuses and network interfaces (not shown in FIG. 14).

The memory 1204 may store therein a plurality of modules or units including a biometric extraction module 1206; a predetermined matching rule module 1208; a characteristic matching module 1210; a data selection module 1212; a coefficient calculation module 1214; a first decryption module 1216; and a second decryption module 1302.

As shown in FIG. 14, the memory 1204 may further store therein a cyclic check module 1402 that performs a cyclic redundancy check on the first decrypted information or second decrypted information.

For example, when hash data is added in the acquired candidate sample data, the cyclic check module 1402 may be used to check the first decrypted information or the second decrypted information, and if the first decrypted information or the second decrypted information does not pass the check, N groups of data in the candidate sample data may be re-selected for calculation to acquire new decrypted information. If the new decrypted information still does not pass the check, another N groups of data will be selected until all N groups of data in the candidate sample data are traversed.

Figure 15:
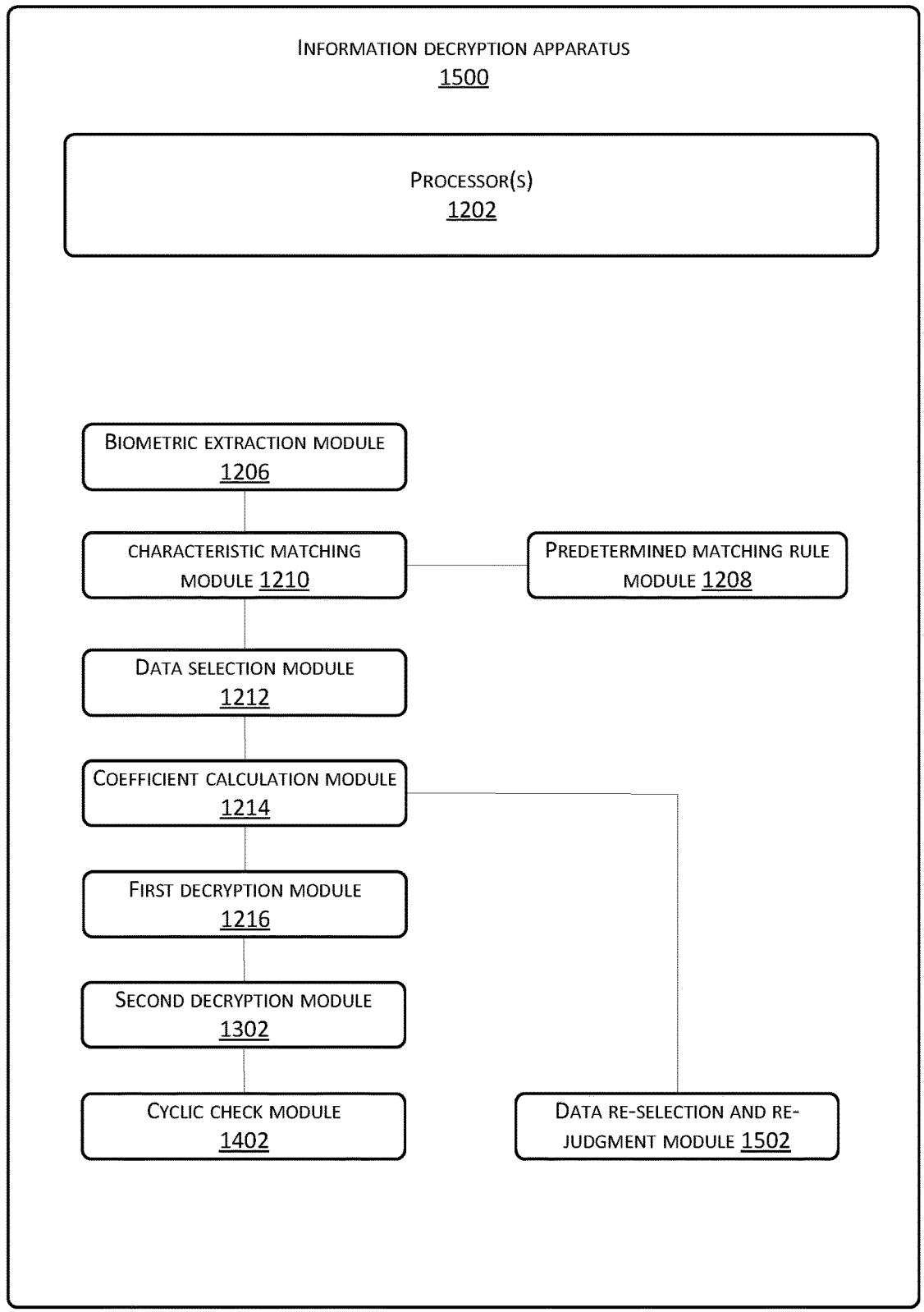
FIG. 15 is a module structural diagram of another example embodiment of an information decryption apparatus according to the present disclosure.

FIG. 15 is a module structural diagram of another example embodiment of the information decryption apparatus, and as shown in FIG. 15, an information decryption apparatus 1500 may include more processor(s) 1202 or data processing unit(s) and memory 1204. The information encryption apparatus 1500 may further include one or more input/output apparatuses and network interfaces (not shown in FIG. 15).

The memory 1204 may store therein a plurality of modules or units including a biometric extraction module 1206; a predetermined matching rule module 1208; a characteristic matching module 1210; a data selection module 1212; a coefficient calculation module 1214; a first decryption module 1216; a second decryption module 1302; and a cyclic check module 1402.

As shown in FIG. 15, the memory 1204 may further store therein a data re-selection and re-judgment module 1502 that: if the decrypted information does not pass the cyclic redundancy check, re-selects N groups of data from the candidate sample data and sends the data to the coefficient calculation module 1214 to acquire new decrypted information, and judges whether the new decrypted information passes the cyclic check; and if none of the decrypted information corresponding to all the N groups of data in L pieces of data of the candidate sample data passes the cyclic redundancy check after the traversing, sends decryption failure information.

The information decryption apparatus may decrypt the candidate sample data in combination with the biometric information and the particular decryption algorithm used by the module in the information decryption apparatus to acquire the original information. An apparatus for decryption in combination with the biometric information of the present disclosure reduces the risk of illegal decryption of the original information.

The present disclosure provides an information encryption and decryption method and apparatus, which may perform encryption on to-be-encrypted information in combination with biometric information by using particular data conversion and encryption algorithms, thereby improving the security of encrypted information. The encryption method in the present disclosure uses a form of constructing the to-be-encrypted information into a polynomial of a predetermined format, and mapping biometric data into the polynomial, thereby improving the complexity of the information encryption, and improving the security of the information encryption. Meanwhile, in the present disclosure, a particular algorithm is used to verify the biometric information during information decryption, which reduces the risk of illegal decryption of the encrypted information.

The apparatus or module illustrated in the above embodiments may, for example be implemented by a computer chip or an entity, or a product with a certain function. For convenience of description, when describing the device above, functions are described as separate modules. Certainly, during implementation of the present disclosure, the functions of the various modules may be achieved in the same or multiple software and/or hardware configurations, or the module implementing the same function may also be implemented by a combination of multiple sub-modules or sub-units.

Those skilled in the art also know that, in addition to implementing a controller by pure computer readable program codes, a logic programming of the operations of the methods may be performed and embedded in the controller to enable the controller to implement the same function in the form of a logic gate, switch, application specific integrated circuit, programmable logic controller and embedded microcontroller. Therefore, the controller may be regarded as a hardware component, and the apparatus included therein and used for implementing various functions may be considered as a structure inside the hardware component; or even the apparatus used for implementing various functions may be regarded as either a software module for implementing the method or a structure inside the hardware component.

As may be seen through the description of the embodiment above, those skilled in the art may clearly understand that the present disclosure may be realized with the aid of software plus the necessary common hardware platform. Based on such an understanding, the technical solution of the present disclosure, whether intrinsically or with respect to portions that contributes to the conventional techniques, is realizable in the form of software products. These computer software products may be stored on storage media, such as ROM/RAM, diskettes, and compact discs, and include a certain number of commands used to cause a set of computer device (which could be a personal computer, mobile terminal, server, or network equipment) to execute the methods described For examples, or certain portions of the embodiments, of the present disclosure.

The example embodiments in the present disclosure are described in a progressive manner, and for identical or similar parts between different embodiments, reference may be made to each other so that each of the example embodiments focuses on differences from other example embodiments. The techniques of the present disclosure may be used in many general purpose or specialized computer system environments or configurations, such as personal computers, server computers, handheld devices or portable equipment, tablet type equipment, multiprocessor systems, microprocessor-based systems, set-top boxes, programmable electronic equipment, networked PCs, minicomputers, mainframe computers, mobile terminals, distributed computing environments that include any of the systems or equipment above, and so forth.

The present disclosure may be described in the general context of computer executable instructions executed by a computer, such as a program module. Generally, program modules include routines, programs, objects, components, data structures, etc. to execute specific tasks or achieve specific abstract data types. The present disclosure may also be carried out in distributed computing environments; in such distributed computing environments that tasks are executed by remote processing equipment connected via communication networks. In distributed computing environments, program modules may be located on computer readable media at local or remote computers that include storage equipment.

Although the present disclosure is described with reference to the example embodiments, a person of ordinary skill in the art should know that the present disclosure may have many variations and changes without departing from the spirit of the present disclosure, and the appended claims are intended to include such variations and changes without departing from the spirit of the present disclosure

What is claimed is:

1. A method implemented by one or more computing devices, the method comprising:
    extracting biometric information to acquire biometric data;
    converting to-be-encrypted information into a polynomial of a predetermined format, wherein converting the to-be-encrypted information into the polynomial of the predetermined format comprises:
        segmenting the to-be-encrypted information into a plurality of segments expressed by a plurality of monomials respectively;
        converting each segment of the to-be-encrypted information into a first preset data format;
        using each segment of the to-be-encrypted information of the first preset data format as a coefficient of a respective monomial of the plurality of monomials; and
        constructing the polynomial based at least in part on the plurality of monomials;
    substituting the biometric data into the polynomial for calculation to acquire a value of the polynomial; and
    using a two-dimensional dataset including the biometric data and the value of the polynomial as first encrypted information.

2. The method of claim 1, wherein:
    the plurality of monomials comprise $a_1 * x^{(k-1)}$, $a_2 * x^{(k-2)}$, ..., $a_k * x^{0}$ from high-bit to low-bit, and
    the polynomial is constructed based further on a formula $p(x)=a_1 * x^{(k-1)}, a_2 * x^{(k-2)}, \ldots, a_k * x^{0}$, wherein:
    $p(x)$ is the polynomial;
    x is a variable of the polynomial;
    $a_1, a_2, \ldots, a_k$ are coefficients of the polynomial, k being a positive integer; and
    (k-1), (k-2), ..., k are powers of the variable x.

3. The method of claim 1, further comprising adding check code information in the to-be-encrypted information.

4. The method of claim 3, wherein the converting to-be-encrypted information into the polynomial of the predetermined format further comprises converting the to-be-encrypted information with the added check code into the polynomial of the predetermined format.

5. The method of claim 1, further comprising adding hash data in the first encrypted information.

6. An apparatus comprising:
    one or more processors;
    memory;
    an information receiving module stored in the memory and executable by the one or more processors to acquire to-be-encrypted information;
    a biometric information module stored in the memory and executable by the one or more processors to extract biometric information to acquire biometric data;
    an information conversion module stored in the memory and executable by the one or more processors to convert the to-be-encrypted information into a polynomial of a predetermined format, wherein the information conversion module comprises:
        a segmenting module stored in the memory and executable by the one or more processors to segment the to-be-encrypted information into a plurality of segments, and express the to-be-encrypted information after the segmentation by a plurality of monomials;
        a first preset data module stored in the memory and executable by the one or more processors to convert each segment of the to-be-encrypted information into a first preset data format and use each segment of the to-be-encrypted information of the first preset data format as a coefficient of a respective monomial of the plurality of monomials; and
        a polynomial construction module stored in the memory and executable by the one or more processors to construct the polynomial based at least in part on the plurality of monomials; and
    a mapping module stored in the memory and executable by the one or more processors to substitute the biometric data into the polynomial for calculation to acquire a value of the polynomial, and form first encrypted information based on two-dimensional data including the biometric data and the value of the polynomial.

7. The apparatus of claim 6, wherein: the information conversion module comprises:
    the plurality of monomials comprise $a_1 * x^{(k-1)}$, $a_2 * x^{(k-2)}$, ..., $a_k * x^{0}$ from high-bit to low-bit respectively; and
    the polynomial is constructed based further on a formula $p(x)=a_1 * x^{(k-1)}, a_2 * x^{(k-2)}, \ldots, a_k * x^{0}$, wherein:
    $p(x)$ is the polynomial;
    x is a variable of the polynomial;
    $a_1, a_2, \ldots, a_k$ are coefficients of the polynomial, k being a positive integer; and
    (k-1), (k-2), ..., k are powers of the variable x.

8. The apparatus of claim 6, further comprising a check code addition module that adds check code information in the to-be-encrypted information.

9. The apparatus of claim 8, wherein the information conversion module further converts the to-be-encrypted information with the added check code into the polynomial of the predetermined format.

10. The apparatus of claim 6, further comprising a hash data module that adds hash data in the first encrypted information.

11. The apparatus of claim 6, wherein the biometric information includes biometric information of a fingerprint or a retina.

12. An apparatus comprising:
    one or more processors;
    memory;
    a biometric extraction module stored in the memory and executable by the one or more processors to extract biometric information and acquire to-be-verified biometric data;
    a predetermined matching rule module stored in the memory and executable by the one or more processors to store a preset matching rule of sample data and to-be-verified biometric data and a matching requirement of candidate sample data;
    a characteristic matching module stored in the memory and executable by the one or more processors to acquire sample data stored in a sample database, and select candidate sample data according to the predetermined matching rule and the matching requirement;
    a data selection module stored in the memory and executable by the one or more processors to select N groups of data from the selected candidate sample data, N being a preset number of groups of selected data;
    a coefficient calculation module stored in the memory and executable by the one or more processors to calculate coefficients in a Lagrange interpolation polynomial corresponding to the selected N groups of data by using a Lagrange interpolation method; and a first decryption module stored in the memory and executable by the one or more processors to combine the acquired coefficients of the Lagrange interpolation polynomial into the first decrypted information according to a predetermined sequence of combination.

13. The apparatus of claim 12, wherein the preset matching rule of sample data and to-be-verified biometric data stored in the predetermined matching rule module comprises: comparing whether data in the to-be-verified biometric data and data in the sample data are identical one by one.

14. The apparatus of claim 13, wherein the matching requirement of candidate sample data stored in the predetermined matching rule module comprises: using sample data with a maximum number of identical comparison data and a matching degree not less than a preset minimum matching degree as the candidate sample data.

15. The apparatus of claim 12, wherein the preset matching rule of sample data and to-be-verified biometric data stored in the predetermined matching rule module comprises: calculating a respective difference between respective biometric data in the sample data and respective data in the to-be-verified biometric data by using any one of following formulas:

$$m = \sum_{i=1}^{n} \min(|a_{i+j} - b_i|)$$

$-t \leq j \leq t;$ $$m = \sum_{i=1}^{n} \min(a_{i+j} - b_i)^2$$

$-t \leq j \leq t;$ or, $$m = \sum_{i=1}^{n} (\min(|a_{i+j} - b_i|))^2$$

$-t \leq j \leq t,$ wherein:

m indicates the difference between the respective biometric data in the sample data and the to-be-verified biometric data;

n indicates a number of data in the to-be-verified biometric data;

$b_i$ indicates a $i^{th}$ data of the to-be-verified biometric data;

$a_{i+j}$ indicates a $(i+j)^{th}$ biometric data in the sample data; and t indicates a preset offset.

16. The apparatus of claim 15, wherein the matching requirement of candidate sample data stored in the predetermined matching rule module comprises: selecting biometric data in sample data with a minimum difference from the to-be-verified biometric data and the minimum difference being not greater than a preset maximum error value as the candidate sample data.

17. The apparatus of claim 12, further comprising: a second decryption module that converts the first decrypted information into second decrypted information according to a predetermined conversion rule.

18. The apparatus of claim 12, further comprising: a cyclic check module that performs a cyclic redundancy check on the first decrypted information.

19. The apparatus of claim 18, further comprising: a data re-selection and re-judgment module that, in response to determining that the first decrypted information does not pass the cyclic redundancy check, re-selects N groups of data from the candidate sample data;

calculates coefficients of a polynomial corresponding to the re-selected N groups of data to acquire new decrypted information; and performs a cyclic redundancy check on the new decrypted information.

20. The apparatus of claim 19, wherein the data re-selection and re-judgment module is further configured to: determine that a result of information decryption is a failure in response to determining that none of decrypted information corresponding to all of N groups of data in L pieces of data of the candidate sample data passes the cyclic redundancy check.

* * * * *